(12) United States Patent
Blackstone et al.

(10) Patent No.: US 9,298,266 B2
(45) Date of Patent: Mar. 29, 2016

(54) SYSTEMS AND METHODS FOR IMPLEMENTING THREE-DIMENSIONAL (3D) GESTURE BASED GRAPHICAL USER INTERFACES (GUI) THAT INCORPORATE GESTURE REACTIVE INTERFACE OBJECTS

(71) Applicant: Aquifi, Inc., Palo Alto, CA (US)

(72) Inventors: Keith Blackstone, San Bruno, CA (US);
Eric Webb, San Francisco, CA (US);
David Girdwood, Sunnyvale, CA (US);
Carlo Dal Mutto, Sunnyvale, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 13/965,157

(22) Filed: Aug. 12, 2013

(65) Prior Publication Data
US 2014/0298273 A1    Oct. 2, 2014

Related U.S. Application Data

(60) Provisional application No. 61/853,298, filed on Apr. 2, 2013, provisional application No. 61/854,705, filed on Apr. 29, 2013.

(51) Int. Cl.
*G06F 3/033* (2013.01)
*G06F 3/01* (2006.01)

(52) U.S. Cl.
CPC .................................... *G06F 3/017* (2013.01)

(58) Field of Classification Search
None
See application file for complete search history.

(56) References Cited

U.S. PATENT DOCUMENTS

| 5,454,043 | A | 9/1995 | Freeman et al. |
| 5,852,672 | A | 12/1998 | Lu |
| 6,191,773 | B1 * | 2/2001 | Maruno et al. ................ 345/158 |

(Continued)

FOREIGN PATENT DOCUMENTS

| WO | 9749262 A1 | 12/1997 |
| WO | 2005091125 A2 | 9/2005 |

(Continued)

OTHER PUBLICATIONS

Canesta3D, Canesta 3D ToF Sensor Demo for Living Room, Youtube, Oct. 28, 2010, Retrieved from: http://www.youtube.com/watch?v=TmKShSHOSYU.

(Continued)

*Primary Examiner* — Stephen Alvesteffer
*Assistant Examiner* — Mahelet Shiberou
(74) *Attorney, Agent, or Firm* — Lewis Roca Rothgerber Christie LLP

(57) ABSTRACT

Systems and methods in accordance with embodiments of the invention implement three-dimensional (3D) gesture based graphical user interfaces (GUI) using gesture reactive interface objects. One embodiment includes using a computing device to render an initial user interface comprising a set of interface objects, detect a targeting 3D gesture in captured image data that identifies a targeted interface object within the user interface, change the rendering of at least the targeted interface object within the user interface in response to the targeting 3D gesture that targets the interface object, detect an interaction 3D gesture in additional captured image data that identifies a specific interaction with a targeted interface object, modify the user interface in response to the interaction with the targeted interface object identified by the interaction 3D gesture, and render the modified user interface.

21 Claims, 21 Drawing Sheets

(56) References Cited

U.S. PATENT DOCUMENTS

| | | | |
|---|---|---|---|
| 6,323,942 B1 | 11/2001 | Bamji | |
| 6,512,838 B1 | 1/2003 | Rafii et al. | |
| 6,515,740 B2 | 2/2003 | Bamji et al. | |
| 6,522,395 B1 | 2/2003 | Bamji et al. | |
| 6,580,496 B2 | 6/2003 | Bamji et al. | |
| 6,587,186 B2 | 7/2003 | Bamji et al. | |
| 6,614,422 B1 | 9/2003 | Rafii | |
| 6,674,895 B2 | 1/2004 | Rafii et al. | |
| 6,678,039 B2 | 1/2004 | Charbon | |
| 6,690,354 B2 | 2/2004 | Sze | |
| 6,690,618 B2 | 2/2004 | Tomasi et al. | |
| 6,710,770 B2 | 3/2004 | Tomasi et al. | |
| 6,778,699 B1 | 8/2004 | Gallagher | |
| 6,834,120 B1 | 12/2004 | LeClerc et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 6,944,315 B1 | 9/2005 | Zipperer et al. | |
| 7,006,236 B2 | 2/2006 | Tomasi et al. | |
| 7,031,525 B2 | 4/2006 | Beardsley | |
| 7,038,659 B2 | 5/2006 | Rajkowski | |
| 7,050,177 B2 | 5/2006 | Tomasi et al. | |
| 7,151,530 B2 | 12/2006 | Roeber et al. | |
| 7,157,685 B2 | 1/2007 | Bamji et al. | |
| 7,173,230 B2 | 2/2007 | Charbon | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,274,800 B2 | 9/2007 | Nefian et al. | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,433,029 B1 | 10/2008 | Hsu | |
| 7,450,220 B2 | 11/2008 | O'Connor et al. | |
| 7,464,351 B2 | 12/2008 | Bamji et al. | |
| 7,471,376 B2 | 12/2008 | Bamji et al. | |
| 7,507,947 B2 | 3/2009 | Bamji et al. | |
| 7,511,801 B1 | 3/2009 | Rafii et al. | |
| 7,519,201 B2 | 4/2009 | Yang et al. | |
| 7,526,120 B2 | 4/2009 | Gokturk et al. | |
| 7,636,150 B1 | 12/2009 | McCauley et al. | |
| 7,653,833 B1 | 1/2010 | Miller et al. | |
| 7,653,883 B2 | 1/2010 | Hotelling et al. | |
| 7,665,041 B2 | 2/2010 | Wilson et al. | |
| 7,719,662 B2 | 5/2010 | Bamji et al. | |
| 7,741,961 B1 | 6/2010 | Rafii et al. | |
| 7,791,715 B1 | 9/2010 | Bamji | |
| 7,805,003 B1 | 9/2010 | Cohen et al. | |
| 7,877,707 B2 | 1/2011 | Westerman et al. | |
| 7,936,449 B1 | 5/2011 | Bamji et al. | |
| 7,994,465 B1 | 8/2011 | Bamji et al. | |
| 8,009,865 B2 | 8/2011 | Kim et al. | |
| 8,009,871 B2 | 8/2011 | Rafii et al. | |
| D645,493 S | 9/2011 | Zhao | |
| 8,086,971 B2 | 12/2011 | Radivojevic et al. | |
| 8,134,637 B2 | 3/2012 | Rossbach | |
| 8,139,141 B2 | 3/2012 | Bamji et al. | |
| 8,139,142 B2 | 3/2012 | Bamji et al. | |
| 8,175,412 B2 | 5/2012 | Basri et al. | |
| 8,179,604 B1 | 5/2012 | Prada Gomez et al. | |
| 8,180,114 B2 | 5/2012 | Nishihara et al. | |
| 8,187,097 B1 | 5/2012 | Zhang | |
| 8,194,233 B2 | 6/2012 | Bamji | |
| 8,203,699 B2 | 6/2012 | Bamji et al. | |
| 8,212,859 B2 | 7/2012 | Tang et al. | |
| 8,232,990 B2 | 7/2012 | King et al. | |
| 8,265,350 B2 | 9/2012 | Torii et al. | |
| 8,274,535 B2 | 9/2012 | Hildreth et al. | |
| 8,314,924 B2 | 11/2012 | Bamji et al. | |
| 8,339,359 B2 | 12/2012 | Hsieh et al. | |
| 8,363,212 B2 | 1/2013 | Bamji et al. | |
| 8,368,795 B2 | 2/2013 | Lo et al. | |
| 8,462,132 B2 | 6/2013 | Ren et al. | |
| 8,483,489 B2 | 7/2013 | Van Beek et al. | |
| 8,525,876 B2 | 9/2013 | Fan et al. | |
| 8,539,359 B2 | 9/2013 | Rapaport et al. | |
| 8,552,983 B2 | 10/2013 | Chiu | |
| 8,587,773 B2 | 11/2013 | Bamji et al. | |
| 8,589,033 B2 | 11/2013 | Rafii et al. | |
| 8,602,887 B2 | 12/2013 | Tardif et al. | |
| 8,615,108 B1 | 12/2013 | Stoppa et al. | |
| 8,625,846 B2 | 1/2014 | Dahl | |
| 8,643,701 B2 | 2/2014 | Nguyen et al. | |
| 8,655,021 B2 | 2/2014 | Dal Mutto et al. | |
| 8,666,115 B2 | 3/2014 | Perski et al. | |
| 8,675,182 B2 | 3/2014 | Bamji | |
| 8,681,124 B2 | 3/2014 | Bamji et al. | |
| 8,686,943 B1 | 4/2014 | Rafii | |
| 8,693,724 B2 | 4/2014 | Ahmed et al. | |
| 8,773,512 B1 | 7/2014 | Rafii | |
| 8,787,663 B2 | 7/2014 | Litvak et al. | |
| 8,818,027 B2 | 8/2014 | Forutanpour et al. | |
| 8,824,737 B2 | 9/2014 | Gurman et al. | |
| 8,830,312 B2 | 9/2014 | Hummel et al. | |
| 8,836,768 B1 | 9/2014 | Rafii et al. | |
| 8,840,466 B2 | 9/2014 | Kareemi et al. | |
| 8,854,433 B1 | 10/2014 | Rafii | |
| 8,934,675 B2 | 1/2015 | Dal Mutto et al. | |
| 8,941,588 B2 | 1/2015 | Minnen | |
| 2002/0112095 A1 | 8/2002 | Ford et al. | |
| 2002/0140633 A1 | 10/2002 | Rafii et al. | |
| 2003/0021032 A1 | 1/2003 | Bamji et al. | |
| 2003/0132921 A1 | 7/2003 | Torunoglu et al. | |
| 2003/0132950 A1 | 7/2003 | Surucu et al. | |
| 2003/0165048 A1 | 9/2003 | Bamji et al. | |
| 2003/0169906 A1 | 9/2003 | Gokturk et al. | |
| 2003/0172375 A1 | 9/2003 | Shaw et al. | |
| 2003/0174125 A1 | 9/2003 | Torunoglu et al. | |
| 2004/0046744 A1 | 3/2004 | Rafii et al. | |
| 2004/0066500 A1 | 4/2004 | Gokturk et al. | |
| 2004/0170323 A1 | 9/2004 | Cootes et al. | |
| 2005/0134853 A1 | 6/2005 | Ingleson et al. | |
| 2005/0238229 A1 | 10/2005 | Ishidera | |
| 2005/0271279 A1 | 12/2005 | Fujimura et al. | |
| 2006/0187214 A1 | 8/2006 | Gillespie et al. | |
| 2006/0197753 A1 | 9/2006 | Hotelling | |
| 2006/0241371 A1 | 10/2006 | Rafii et al. | |
| 2006/0272436 A1 | 12/2006 | Lein et al. | |
| 2007/0057946 A1 | 3/2007 | Albeck et al. | |
| 2007/0299631 A1 | 12/2007 | Macbeth et al. | |
| 2008/0059390 A1 | 3/2008 | Cox et al. | |
| 2008/0120577 A1 | 5/2008 | Ma et al. | |
| 2008/0281523 A1 | 11/2008 | Dahl et al. | |
| 2009/0021489 A1 | 1/2009 | Westerman et al. | |
| 2009/0077161 A1 | 3/2009 | Hamilton, II et al. | |
| 2009/0079813 A1* | 3/2009 | Hildreth | 348/14.03 |
| 2009/0103780 A1 | 4/2009 | Nishihara et al. | |
| 2009/0110301 A1 | 4/2009 | Schopp et al. | |
| 2009/0153671 A1 | 6/2009 | Lee et al. | |
| 2009/0183125 A1* | 7/2009 | Magal et al. | 715/863 |
| 2009/0228841 A1* | 9/2009 | Hildreth | 715/863 |
| 2009/0290811 A1 | 11/2009 | Imai | |
| 2009/0307658 A1* | 12/2009 | Freitas et al. | 717/113 |
| 2010/0027845 A1 | 2/2010 | Kim et al. | |
| 2010/0027846 A1 | 2/2010 | Xu et al. | |
| 2010/0027892 A1 | 2/2010 | Guan et al. | |
| 2010/0053151 A1 | 3/2010 | Marti et al. | |
| 2010/0110384 A1 | 5/2010 | Maekawa | |
| 2010/0124949 A1 | 5/2010 | Demuynck et al. | |
| 2010/0156676 A1 | 6/2010 | Mooring et al. | |
| 2010/0192109 A1 | 7/2010 | Westerman et al. | |
| 2010/0199228 A1 | 8/2010 | Latta et al. | |
| 2010/0202663 A1 | 8/2010 | Kim et al. | |
| 2010/0208038 A1 | 8/2010 | Kutliroff et al. | |
| 2010/0211920 A1 | 8/2010 | Westerman et al. | |
| 2010/0229125 A1 | 9/2010 | Cha | |
| 2010/0235786 A1 | 9/2010 | Maizels et al. | |

(56) References Cited

U.S. PATENT DOCUMENTS

| | | | |
|---|---|---|---|
| 2010/0245238 A1* | 9/2010 | Kumagai et al. | 345/156 |
| 2010/0265316 A1 | 10/2010 | Sali et al. | |
| 2010/0271511 A1 | 10/2010 | Ma et al. | |
| 2010/0284082 A1 | 11/2010 | Shpunt et al. | |
| 2010/0296368 A1 | 11/2010 | Dahl et al. | |
| 2010/0306714 A1 | 12/2010 | Latta et al. | |
| 2010/0321389 A1 | 12/2010 | Gay et al. | |
| 2010/0329511 A1 | 12/2010 | Yoon et al. | |
| 2011/0025827 A1 | 2/2011 | Shpunt et al. | |
| 2011/0052006 A1 | 3/2011 | Gurman et al. | |
| 2011/0069389 A1 | 3/2011 | Shpunt | |
| 2011/0074675 A1 | 3/2011 | Shiming et al. | |
| 2011/0075259 A1 | 3/2011 | Shpunt | |
| 2011/0096954 A1 | 4/2011 | Dahl | |
| 2011/0103448 A1 | 5/2011 | Dahl et al. | |
| 2011/0114857 A1 | 5/2011 | Akerman et al. | |
| 2011/0115892 A1 | 5/2011 | Fan et al. | |
| 2011/0134036 A1 | 6/2011 | Suggs | |
| 2011/0134114 A1 | 6/2011 | Rais et al. | |
| 2011/0148798 A1 | 6/2011 | Dahl | |
| 2011/0149044 A1 | 6/2011 | Snin | |
| 2011/0158508 A1 | 6/2011 | Shpunt et al. | |
| 2011/0164032 A1* | 7/2011 | Shadmi | 345/419 |
| 2011/0173574 A1 | 7/2011 | Clavin et al. | |
| 2011/0187878 A1 | 8/2011 | Mor et al. | |
| 2011/0188054 A1 | 8/2011 | Petronius et al. | |
| 2011/0193939 A1* | 8/2011 | Vassigh et al. | 348/46 |
| 2011/0197161 A1* | 8/2011 | Mattingly et al. | 715/810 |
| 2011/0205421 A1 | 8/2011 | Shpunt et al. | |
| 2011/0211044 A1 | 9/2011 | Shpunt et al. | |
| 2011/0211073 A1 | 9/2011 | Foster | |
| 2011/0211754 A1 | 9/2011 | Litvak et al. | |
| 2011/0219340 A1 | 9/2011 | Pathangay et al. | |
| 2011/0221974 A1 | 9/2011 | Stern et al. | |
| 2011/0222726 A1 | 9/2011 | Ruan | |
| 2011/0243380 A1 | 10/2011 | Forutanpour et al. | |
| 2011/0254762 A1 | 10/2011 | Dahl et al. | |
| 2011/0254765 A1 | 10/2011 | Brand | |
| 2011/0262006 A1 | 10/2011 | Nakano | |
| 2011/0267456 A1 | 11/2011 | Adermann | |
| 2011/0274357 A1 | 11/2011 | Iwamoto et al. | |
| 2011/0286673 A1 | 11/2011 | Givon et al. | |
| 2011/0289455 A1 | 11/2011 | Reville et al. | |
| 2011/0291925 A1 | 12/2011 | Israel et al. | |
| 2011/0291926 A1 | 12/2011 | Gokturk et al. | |
| 2011/0291988 A1 | 12/2011 | Bamji et al. | |
| 2011/0292036 A1 | 12/2011 | Sali et al. | |
| 2011/0292181 A1 | 12/2011 | Acharya et al. | |
| 2011/0292370 A1 | 12/2011 | Hills et al. | |
| 2011/0292380 A1 | 12/2011 | Bamji | |
| 2011/0293137 A1 | 12/2011 | Gurman et al. | |
| 2011/0294574 A1 | 12/2011 | Yamada et al. | |
| 2011/0295562 A1 | 12/2011 | Mehta et al. | |
| 2011/0296353 A1* | 12/2011 | Ahmed et al. | 715/848 |
| 2011/0298704 A1 | 12/2011 | Krah | |
| 2011/0300929 A1 | 12/2011 | Tardif et al. | |
| 2011/0304541 A1 | 12/2011 | Dalal | |
| 2011/0310010 A1 | 12/2011 | Hoffnung et al. | |
| 2011/0310125 A1 | 12/2011 | McEldowney et al. | |
| 2012/0011454 A1 | 1/2012 | Droz et al. | |
| 2012/0027252 A1 | 2/2012 | Liu et al. | |
| 2012/0038986 A1 | 2/2012 | Pesach | |
| 2012/0042150 A1 | 2/2012 | Saar | |
| 2012/0042246 A1* | 2/2012 | Schwesinger et al. | 715/716 |
| 2012/0050488 A1 | 3/2012 | Cohen et al. | |
| 2012/0051605 A1 | 3/2012 | Nagar et al. | |
| 2012/0069168 A1 | 3/2012 | Huang et al. | |
| 2012/0070070 A1 | 3/2012 | Litvak | |
| 2012/0072939 A1 | 3/2012 | Crenshaw | |
| 2012/0078614 A1 | 3/2012 | Galor et al. | |
| 2012/0088581 A1 | 4/2012 | Mao et al. | |
| 2012/0092304 A1 | 4/2012 | Katz | |
| 2012/0099403 A1 | 4/2012 | Dahl et al. | |
| 2012/0106792 A1 | 5/2012 | Kang et al. | |
| 2012/0124604 A1 | 5/2012 | Small et al. | |
| 2012/0139835 A1 | 6/2012 | Morrison et al. | |
| 2012/0140094 A1 | 6/2012 | Shpunt et al. | |
| 2012/0140109 A1 | 6/2012 | Shpunt et al. | |
| 2012/0169583 A1 | 7/2012 | Rippel et al. | |
| 2012/0169671 A1 | 7/2012 | Yasutake | |
| 2012/0176414 A1 | 7/2012 | Givon | |
| 2012/0182464 A1 | 7/2012 | Shpunt et al. | |
| 2012/0202569 A1 | 8/2012 | Maizels et al. | |
| 2012/0204133 A1 | 8/2012 | Guendelman et al. | |
| 2012/0204202 A1 | 8/2012 | Rowley et al. | |
| 2012/0206339 A1 | 8/2012 | Dahl | |
| 2012/0218183 A1 | 8/2012 | Givon et al. | |
| 2012/0223882 A1 | 9/2012 | Galor et al. | |
| 2012/0243374 A1 | 9/2012 | Dahl et al. | |
| 2012/0249744 A1 | 10/2012 | Pesach et al. | |
| 2012/0268364 A1 | 10/2012 | Minnen | |
| 2012/0270653 A1 | 10/2012 | Kareemi et al. | |
| 2012/0274550 A1 | 11/2012 | Campbell et al. | |
| 2012/0274610 A1 | 11/2012 | Dahl | |
| 2012/0281240 A1 | 11/2012 | Cohen et al. | |
| 2012/0299820 A1 | 11/2012 | Dahl | |
| 2012/0304067 A1 | 11/2012 | Han et al. | |
| 2012/0306876 A1 | 12/2012 | Shotton et al. | |
| 2012/0309532 A1 | 12/2012 | Ambrus et al. | |
| 2012/0313848 A1 | 12/2012 | Galor et al. | |
| 2012/0313900 A1 | 12/2012 | Dahl | |
| 2012/0327125 A1 | 12/2012 | Kutliroff et al. | |
| 2013/0014052 A1 | 1/2013 | Frey et al. | |
| 2013/0038601 A1 | 2/2013 | Han et al. | |
| 2013/0038881 A1 | 2/2013 | Pesach et al. | |
| 2013/0038941 A1 | 2/2013 | Pesach et al. | |
| 2013/0044053 A1 | 2/2013 | Galor et al. | |
| 2013/0050080 A1 | 2/2013 | Dahl et al. | |
| 2013/0055120 A1 | 2/2013 | Galor et al. | |
| 2013/0055143 A1* | 2/2013 | Martin et al. | 715/779 |
| 2013/0055150 A1 | 2/2013 | Galor | |
| 2013/0057654 A1 | 3/2013 | Rafii et al. | |
| 2013/0063487 A1 | 3/2013 | Spiegel et al. | |
| 2013/0069876 A1 | 3/2013 | Cheng et al. | |
| 2013/0094329 A1 | 4/2013 | Dahl et al. | |
| 2013/0106692 A1 | 5/2013 | Maizels et al. | |
| 2013/0107021 A1 | 5/2013 | Maizels et al. | |
| 2013/0135312 A1 | 5/2013 | Yang et al. | |
| 2013/0147770 A1 | 6/2013 | Dahl et al. | |
| 2013/0155031 A1 | 6/2013 | Dahl et al. | |
| 2013/0162527 A1 | 6/2013 | Dahl | |
| 2013/0176258 A1 | 7/2013 | Dahl et al. | |
| 2013/0179034 A1 | 7/2013 | Pryor | |
| 2013/0194180 A1* | 8/2013 | Ahn et al. | 345/157 |
| 2013/0201316 A1 | 8/2013 | Binder et al. | |
| 2013/0211843 A1 | 8/2013 | Clarkson | |
| 2013/0216094 A1 | 8/2013 | DeLean | |
| 2013/0236089 A1 | 9/2013 | Litvak et al. | |
| 2013/0335573 A1 | 12/2013 | Forutanpour et al. | |
| 2014/0007022 A1 | 1/2014 | Tocino Diaz et al. | |
| 2014/0043598 A1 | 2/2014 | Bamji et al. | |
| 2014/0119599 A1 | 5/2014 | Dal Mutto et al. | |
| 2014/0152569 A1 | 6/2014 | Liu et al. | |
| 2014/0173440 A1 | 6/2014 | Dal Mutto et al. | |
| 2014/0211991 A1 | 7/2014 | Stoppa et al. | |
| 2014/0211992 A1 | 7/2014 | Stoppa et al. | |
| 2015/0009119 A1 | 1/2015 | Zuccarino et al. | |
| 2015/0057082 A1 | 2/2015 | Kareemi et al. | |
| 2015/0062003 A1 | 3/2015 | Rafii et al. | |
| 2015/0062004 A1 | 3/2015 | Rafii | |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |

(56) References Cited

FOREIGN PATENT DOCUMENTS

| | | | |
|---|---|---|---|
| WO | 2010046901 | A2 | 4/2010 |
| WO | 2010046901 | A3 | 8/2010 |
| WO | 2010086866 | A1 | 8/2010 |
| WO | 2010096279 | A2 | 8/2010 |
| WO | 2010103482 | A2 | 9/2010 |
| WO | 2010096279 | A3 | 11/2010 |
| WO | 2010103482 | A3 | 11/2010 |
| WO | 2011013079 | A1 | 2/2011 |
| WO | 2011033519 | A1 | 3/2011 |
| WO | 2011045789 | A1 | 4/2011 |
| WO | 2012011044 | A1 | 1/2012 |
| WO | 2012020380 | A1 | 2/2012 |
| WO | 2012020410 | A2 | 2/2012 |
| WO | 2012066501 | A1 | 5/2012 |
| WO | 2012081012 | A1 | 6/2012 |
| WO | 2012093394 | A2 | 7/2012 |
| WO | 2012095756 | A2 | 7/2012 |
| WO | 2012098534 | A1 | 7/2012 |
| WO | 2012107892 | A2 | 8/2012 |
| WO | 2012119633 | A1 | 9/2012 |
| WO | 2012119885 | A1 | 9/2012 |
| WO | 2012107892 | A3 | 11/2012 |
| WO | 2012164562 | A1 | 12/2012 |
| WO | 2013008236 | A1 | 1/2013 |
| WO | 2013018099 | A2 | 2/2013 |
| WO | 2013021385 | A2 | 2/2013 |
| WO | 2012095756 | A3 | 7/2013 |
| WO | 2014120554 | A2 | 8/2014 |
| WO | 2014120554 | A3 | 3/2015 |

OTHER PUBLICATIONS

Canesta3D, "Canesta PC demo video", Youtube, Oct. 25, 2010, Retrieved from: http://www.youtube.com/watch?v=I36Aqk1A6vY.

Canesta3D, "Canesta TV Gesture User Interface Demo", Youtube, May 29, 2009, Retrieved from: http://www.youtube.com/watch?v=uR27dPHI7dQ.

Canesta3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

Canesta3D, "Future of Remote Control", Youtube, Oct. 29, 2009, Retrieved from: http://www.youtube.com/watch?v=vnfdoDHiNil.

Canesta3D, "Point Cloud Demo, using Canesta's 320×200 3D Tof Image Sensor", Youtube, Oct. 28, 2010, Retrieved from: http://www.youtube.com/watch?v=4xIXsJuH74c.

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Conference on Image Processing, Computer Vision, & Pattern Recognition, Las Vegas, Nevada, Jun. 26-29, 2006, pp. 383-389.

Carmody, Tim, "Why 'Gorilla Arm Syndrome' Rules Out Multitouch Notebook Displays", Wired, Oct. 10, 2010, Retrieved from http://www.wired.com/gadgetlab/2010/10/gorilla-arm-multitouch/, 3 pgs.

Forsyth, "Computer Vision—A Modern Approach", Recognition as Template Matching, 46 pgs.

Hasan, et al., "Real Time Fingers and Palm Locating using Dynamic Circle Templates", International Journal of Computer Applications, vol. 41, 6, Mar. 2012, pp. 33-43.

Kerdvibulvech, et al., "Markerless Guitarist Fingertip Detection Using a Bayesian Classifier and a Template Matching for Supporting Guitarists", Proc.10th Virtual Reality Int. Conf, Apr. 2008, 7 pgs.

Kolsch, et al., "Flocks of Features for Tracking Articulated Objects", Retrieved from http://www.cs.ucsb.edu/~mturk/pubs/KolschBook05.pdf, pp. 1-18.

Lin, John, "Visual Hand Tracking and Gesture Analysis", Dissertation, University of Illinois at Urbana-Champaign, 2004, 116 pgs.

Murase, et al., "Gesture Keyboard Requiring Only One Camera", ACM UIST'11, Santa Barbara, CA, Oct. 16-19, 2011, pp. 1-2.

Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.

Onishi, et al., "3D Human Posture Estimation Using HOG Features of Monocular Images", Pattern Recognition, Peng-Yeng Yin (Ed.), Nov. 6, 2012, 54 pgs.

Rautaray, et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

"0V7740 VGA product brief", OmniVision, Retrieved from: http://www.ovt.com/download_document.php?type=sensor&sensorid=83, Oct. 2010, 2 pgs.

Zhang, Zhengyou, "Flexible Camera Calibration by Viewing a Plane From Unknown Orientations", Microsoft Research, Redmond, WA, 1999, 8 pgs.

International Search Report and Written Opinion for International Application PCT/US2014/012748, report completed Nov. 30, 2014, Mailed Jan. 14, 2015, 17 Pgs.

Forssen, et al., "Shape Descriptors for Maximally Stable Extremal Regions", Computer Vision, 2007. ICCV 2007. IEEE 11th International Conference on 2007, 1-8.

Vincent, et al., "Matching with epipolar gradient features and edge transfer", Image Processing, 2003. ICIP 2003. Proceedings. 2003 International Conference on (vol. 1), I, 2003, 277-80.

\* cited by examiner

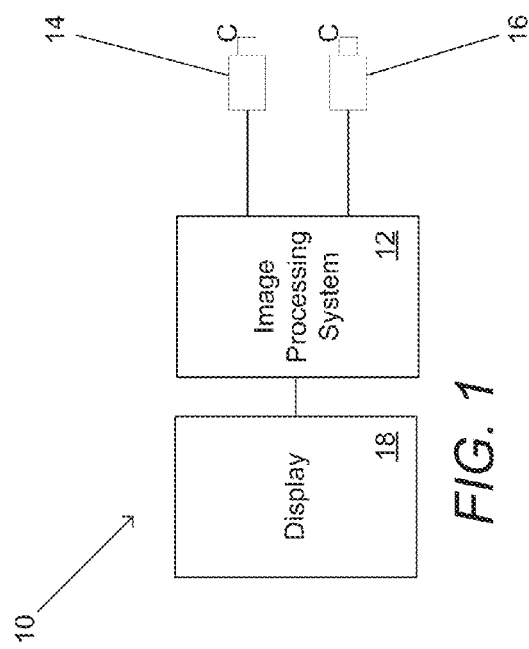
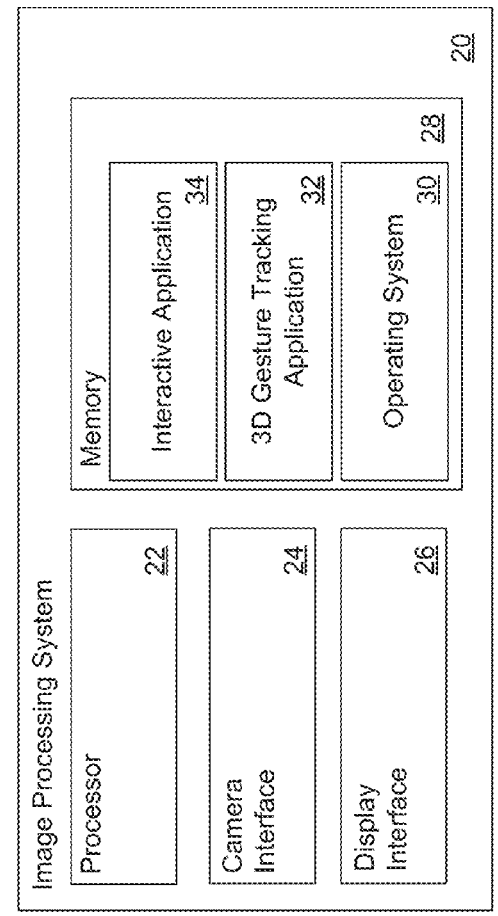
FIG. 1
FIG. 2

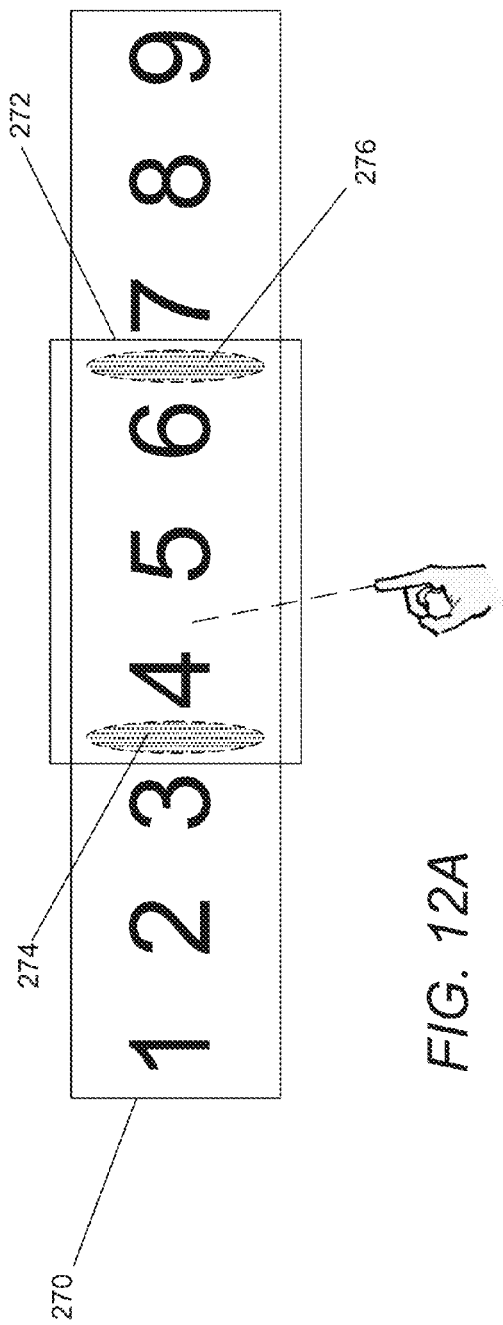
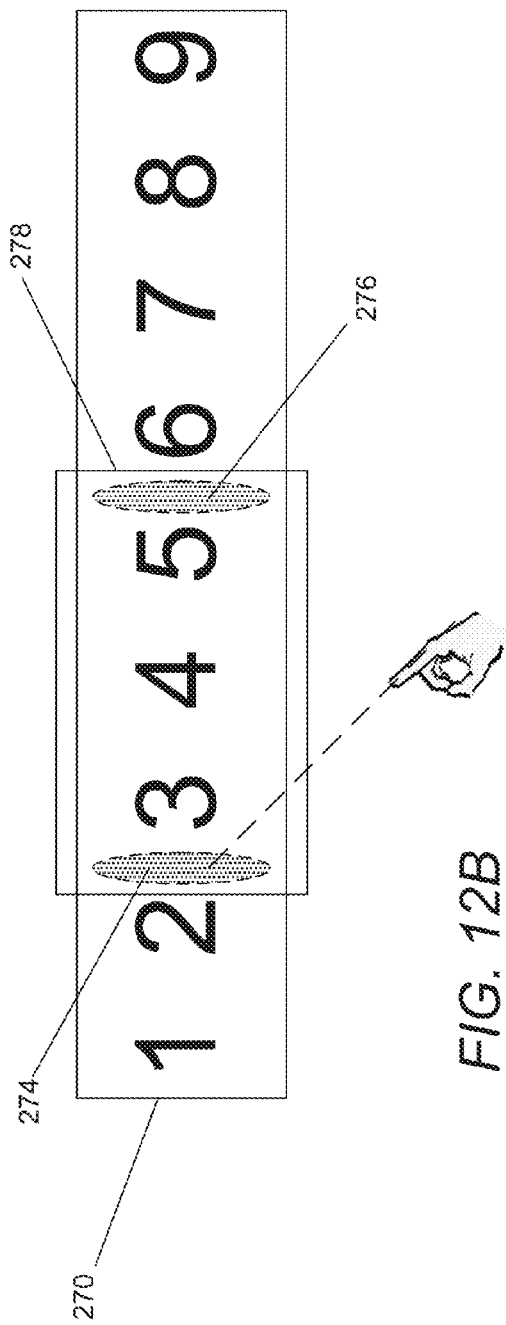
FIG. 12A
FIG. 12B

SYSTEMS AND METHODS FOR IMPLEMENTING THREE-DIMENSIONAL (3D) GESTURE BASED GRAPHICAL USER INTERFACES (GUI) THAT INCORPORATE GESTURE REACTIVE INTERFACE OBJECTS

CROSS-REFERENCE TO RELATED APPLICATIONS

The current application claims priority under 35 U.S.C. §119(e) to U.S. Provisional Patent Application No. 61/853,298, filed Apr. 2, 2013 and U.S. Provisional Patent Application No. 61/854,705, filed Apr. 29, 2013. The disclosures of U.S. Provisional Patent Application Nos. 61/853,298 and 61/854,705 are incorporated herein by reference in their entirety.

FIELD OF THE INVENTION

The present invention relates generally to user interfaces and more specifically to 3D gesture based interaction with interface objects.

BACKGROUND

Operating systems can be found on almost any device that contains a computing system from cellular phones and video game consoles to supercomputers and web servers. A device's operating system (OS) is a collection of software that manages computer hardware resources and provides common services for user application programs. The OS typically acts as an interface between the hardware and the programs requesting input or output (I/O), CPU resources and memory allocation. When an application executes on a computer system with an operating system, the application's code is usually executed directly by the hardware and can make system calls to the OS or be interrupted by it. The portion of the OS code that interacts directly with the computer hardware and implements services for applications is typically referred to as the kernel of the OS. The portion that interfaces with the applications and users is known as the shell. The user can interact with the shell using a variety of techniques including (but not limited to) using a command line interface or a graphical user interface (GUI).

Most modern computing devices support graphical user interfaces (GUI). GUIs are typically rendered using one or more interface objects. Actions in a GUI are usually performed through direct manipulation of graphical elements such as icons. In order to facilitate interaction, the GUI can incorporate one or more interface objects referred to as interaction elements that are visual indicators of user action or intent (such as a pointer), or affordances showing places where the user may interact. The term affordance here is used to refer to the fact that the interaction element suggests actions that can be performed by the user within the GUI.

A GUI typically uses a series of interface objects to represent in a consistent manner the ways in which a user can manipulate the information presented to the user via the user interface. In the context of traditional personal computers employing a keyboard and a pointing device, the most common combination of such objects in GUIs is the Window, Icon, Menu, Pointing Device (WIMP) paradigm. The WIMP style of interaction uses a virtual input device to control the position of a pointer, most often a mouse, trackball and/or trackpad and presents information organized in windows and/or tabs and represented with icons. Available commands are listed in menus, and actions can be performed by making gestures with the pointing device.

The term user experience is generally used to describe a person's emotions about using a product, system or service. With respect to user interface design, the ease with which a user can interact with the user interface is a significant component of the user experience of a user interacting with a system that incorporates the user interface. A user interface in which task completion is difficult due to an inability to accurately convey input to the user interface can lead to negative user experience, as can a user interface that rapidly leads to fatigue.

Touch interfaces, such as touch screen displays and trackpads, enable users to interact with GUIs via two dimensional (2D) gestures (i.e. gestures that contact the touch interface). The ability of the user to directly touch an interface object displayed on a touch screen can obviate the need to display a cursor. In addition, the limited screen size of most mobile devices has created a preference for applications that occupy the entire screen instead of being contained within windows. As such, most mobile devices that incorporate touch screen displays do not implement WIMP interfaces. Instead, mobile devices utilize GUIs that incorporate icons and menus and that rely heavily upon a touch screen user interface to enable users to identify the icons and menus with which they are interacting.

Multi-touch GUIs are capable of receiving and utilizing multiple temporally overlapping touch inputs from multiple fingers, styluses, and/or other such manipulators (as opposed to inputs from a single touch, single mouse, etc.). The use of a multi-touch GUI may enable the utilization of a broader range of touch-based inputs than a single-touch input device that cannot detect or interpret multiple temporally overlapping touches. Multi-touch inputs can be obtained in a variety of different ways including (but not limited to) via touch screen displays and/or via trackpads (pointing device).

In many GUIs, scrolling and zooming interactions are performed by interacting with interface objects that permit scrolling and zooming actions. Interface objects can be nested together such that one interface object (often referred to as the parent) contains a second interface object (referred to as the child). The behavior that is permitted when a user touches an interface object or points to the interface object is typically determined by the interface object and the requested behavior is typically performed on the nearest ancestor object that is capable of the behavior, unless an intermediate ancestor object specifies that the behavior is not permitted. The zooming and/or scrolling behavior of nested interface objects can also be chained. When a parent interface object is chained to a child interface object, the parent interface object will continue zooming or scrolling when a child interface object's zooming or scrolling limit is reached.

The evolution of 2D touch interactions has led to the emergence of user interfaces that are capable of 3D interactions. A variety of machine vision techniques have been developed to perform three dimensional (3D) gesture detection using image data captured by one or more digital cameras (RGB and/or IR), or one or more 3D sensors such as time-of-flight cameras, and structured light cameras. Detected gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures.

SUMMARY OF THE INVENTION

Systems and methods in accordance with embodiments of the invention implement three-dimensional (3D) gesture based graphical user interfaces (GUI) using gesture reactive interface objects. One embodiment includes rendering an initial user interface comprising a set of interface objects using a computing device, detecting a targeting 3D gesture in captured image data that identifies a targeted interface object within the user interface using the computing device, changing the rendering of at least the targeted interface object within the user interface in response to the targeting 3D gesture that targets the interface object using the computing device, detecting an interaction 3D gesture in additional captured image data that identifies a specific interaction with a targeted interface object using the computing device, modifying the user interface in response to the interaction with the targeted interface object identified by the interaction 3D gesture using the computing device, and rendering the modified user interface using the computing device.

In a further embodiment the computing device is part of a real-time gesture based interactive system further comprising a display device and an image capture system, and the method further includes: displaying the rendered user interfaces using the display; and capturing the captured image data and the additional captured image data using the image capture system.

In another embodiment, an interface object comprises: a graphical element that is rendered when the interface object is rendered for display; and a target zone that defines at least one region in the user interface in which a targeting 3D gesture targets the interface object.

In a still further embodiment, the interface object further comprises a description of a set of permitted interactions.

In still another embodiment, detecting a targeting 3D gesture in captured image data that identifies a targeted interface object within the user interface using the computing device further comprises detecting a targeting 3D gesture that targets the target zone of one of the interface objects within the user interface.

In a yet further embodiment, changing the rendering of at least the targeted interface object within the user interface in response to the 3D gesture targeting the interface object using the computing device further comprises changing the size of the graphical element of the targeted interface object.

In yet another embodiment, changing the rendering of at least the targeted interface object within the user interface in response to the 3D gesture targeting the interface object using the computing device further includes changing the size of the graphical elements of a plurality of interface objects including the targeted interface object.

In a further embodiment again, changing the rendering of at least the targeted interface object within the user interface in response to the 3D gesture targeting the interface object using the computing device further includes changing the size of the target zone of the targeted interface object and rendering a graphical element indicating the location of the target zone.

In another embodiment again, changing the rendering of at least the targeted interface object within the user interface in response to the 3D gesture targeting the interface object using the computing device further includes changing the size of the target zone of a plurality of interface objects including the targeted interface object and rendering graphical elements indicating the location of the target zones.

In a further additional embodiment, the interface object further includes a description of a set of permitted interactions, and detecting an interaction 3D gesture in additional captured image data that identifies a specific interaction with a targeted interface object using the computing device further includes verifying that the specific interaction is within the set of permitted interactions for the interface object.

Another additional embodiment also includes displaying an interaction element indicating the time remaining to interact with the targeted interface object in response to the targeting 3D gesture targeting the interface object for a predetermined period of time using the computing device.

In a still yet further embodiment, detecting an interaction 3D gesture in additional captured image data that identifies a specific interaction with a targeted interface object using the computing device further comprises detecting the interaction 3D gesture within a predetermined time period from the receipt of the detection of the targeting 3D gesture.

In still yet another embodiment, detecting a targeting 3D gesture that targets the target zone of one of the interface objects within the user interface further includes: identifying a 3D interaction zone within the captured image data that maps to the user interface; determining the location of at least a portion of a human hand within the 3D interaction zone; mapping the location of the at least a portion of a human hand within the 3D interaction zone to a location within the user interface; and determining that the mapped location within the user interface falls within the target zone of an interface object. In addition, detecting an interaction 3D gesture in additional captured image data that identifies a specific interaction with a targeted interface object using the computing device further: tracking the motion of at least a portion of a human hand within the 3D interaction zone; and determining that the tracked motion of at least a portion of a human hand within the 3D interaction zone corresponds to an interaction 3D gesture.

In a still further embodiment again, determining that the tracked motion of at least a portion of a human hand within the 3D interaction zone corresponds to an interaction 3D gesture further comprises disregarding whether the tracked motion of at least a portion of a human hand occurs within a region of the 3D interaction zone that maps to the target zone of the targeted interface object within the user interface.

In still another embodiment again, determining that the tracked motion of at least a portion of a human hand within the 3D interaction zone corresponds to an interaction 3D gesture further comprises identifying motion corresponding to at least one motion selected from the group consisting of: bending and straightening of at least one finger; and lowering and raising of at least one finger.

In a still further additional embodiment, the targeted interface object is a scrolling interaction element that is rendered as an affordance within the rendered user interface; and the specific interaction within the interaction element causes a scrolling interaction with at least one interface object determined by the scrolling interaction element.

In still another additional embodiment, the targeted interface object is a zooming interaction element that is rendered as an affordance within the rendered user interface, and the specific interaction within the interaction element causes a zooming interaction with at least one interface object determined by the zooming interaction element.

Yet another embodiment again also includes determining that the targeting 3D gesture targets the interface object for a predetermined period of time, where the determination considers the targeting 3D gesture to be targeting the interface object during any period of time in which the targeting 3D gesture does not target the interface object that is less than a hysteresis threshold.

In a yet further additional embodiment, the user interface includes at least one interface object that is an interaction element that is rendered as an affordance, detecting a targeting 3D gesture that targets the target zone of one of the interface objects within the user interface further comprises detecting a targeting 3D gesture that targets the target zone of the interaction element, changing the rendering of at least the targeted interface object within the user interface in response to the 3D gesture targeting the interface object further comprises increasing the size of the affordance, and detecting an interaction 3D gesture in additional captured image data that identifies a specific interaction with a targeted interface object further comprises detecting a targeting 3D gesture that targets the larger affordance of the interaction element.

In yet another additional embodiment, the user interface includes at least one interface object that is an interaction element that is rendered as an affordance, detecting a targeting 3D gesture that targets the target zone of one of the interface objects within the user interface further comprises detecting a targeting 3D gesture that targets the target zone of the interaction element, changing the rendering of at least the targeted interface object within the user interface in response to the 3D gesture targeting the interface object using the computing device further comprises changing the size of the target zone of the targeted interaction element and rendering a graphical element indicating the location of the target zone, and detecting an interaction 3D gesture in additional captured image data that identifies a specific interaction with a targeted interface object further comprises detecting a targeting 3D gesture that targets the larger target zone of the interaction element.

A further additional embodiment again also includes detecting an input via a 3D gesture input modality from captured image data using the computing device, and changing the manner in which the initial user interface is rendered in response to detection of input via a 3D gesture input modality using the computing device.

In another additional embodiment again, changing the manner in which the initial user interface is rendered in response to detection of input via a 3D gesture input modality further comprises changing at least one selected from the group consisting of: the size of the graphical elements of a plurality of interface objects; the size of the target zones of a plurality of interface objects and rendering graphical elements showing the locations of the target zones; and the size of the region of the user interface that is rendered.

In a still yet further embodiment again, detecting an input via a 3D gesture input modality further comprises determining a distance from the display at which 3D gestures are being performed to provide 3D gesture input from the captured image data, and changing the manner in which the initial user interface is rendered in response to detection of input via a 3D gesture input modality further comprises changing the manner in which the user interface is rendered based upon the distance from the display at which 3D gestures are being performed to provide 3D gesture input.

Still yet another embodiment again also includes determining a distance of a user from a display on which the rendered user interface is being displayed using the computing device, and changing the manner in which the initial user interface is rendered by the computing device based upon the distance of the user from the display on which the rendered user interface is being displayed.

In a still yet further additional embodiment, changing the manner in which the initial user interface is rendered based upon the distance of the user from the display on which the rendered user interface is being displayed further comprises changing at least one selected from the group consisting of: the size of the graphical elements of a plurality of interface objects; the size of the target zones of a plurality of interface objects and rendering graphical elements showing the locations of the target zones; and the size of the region of the user interface that is rendered.

In a yet further additional embodiment again, the size of at least one of a rendered graphical element or a target zone of at least one interface object is determined based upon at least one of the size of a display on which the rendered user interface is displayed and the resolution of the display.

Yet another additional embodiment again also includes increasing the size of the target zone of the targeted interface object within the user interface in response to the detection of the targeting 3D gesture that targets the interface object using the computing device.

A still yet further additional embodiment again also includes detecting an input via a 3D gesture input modality from captured image data using the computing device, and increasing the size of the target zones of at least one interface object within the user interface in response to the detection of the input via the 3D gesture input modality using the computing device.

Another further embodiment of the method includes rendering an initial user interface including a set of interface objects using the image processing system, where each interface object includes: a graphical element that is rendered when the interface object is rendered for display; a target zone that defines at least one region in the user interface in which a targeting 3D gesture targets the interface object; and a description of a set of permitted interactions. This embodiment of the method also includes displaying the rendered user interface using the display, capturing image data using the image capture system, detecting an input via a 3D gesture input modality from the captured image data using the image processing system, changing the manner in which the initial user interface is rendered in response to detection of input via a 3D gesture input modality using the image processing device, displaying the rendered user interface using the display, and detecting a targeting 3D gesture that targets the target zone of one of the interface objects within the user interface using the image processing system by: identifying a 3D interaction zone within the captured image data that maps to the user interface; determining the location of at least a portion of a human hand within the 3D interaction zone; and mapping the location of the at least a portion of a human hand within the 3D interaction zone to a location within the user interface. Furthermore, this embodiment of the method includes determining that the mapped location within the user interface falls within the target zone of an interface object, changing the rendering of at least the targeted interface object within the user interface in response to the 3D gesture targeting the interface object using the image processing system, displaying the user interface via the display, capturing additional image data using the image capture system, determining that the targeting 3D gesture targets the interface object for a predetermined period of time, where the determination considers the targeting 3D gesture to be targeting the interface object during any period of time in which the targeting 3D gesture does not target the interface object that is less than a hysteresis threshold, displaying an interaction element indicating the time remaining to interact with the targeted interface object in response to a determination that the targeting 3D gesture has targeted the interface object for a predetermined period of time using the image processing system, detecting an interaction 3D gesture in additional captured image data within a predetermined time period from the detection of the targeting 3D gesture input, where the interaction 3D gesture identifies a specific interaction with a targeted interface object using the image processing system and is detected by: tracking the motion of at least a portion of a human hand within the 3D interaction zone; and determining that the tracked motion of at least a portion of a human hand within the 3D interaction zone corresponds to an interaction 3D gesture. This embodiment of the method also includes verifying that the specific interaction is within the set of permitted interactions for the interface object using the image processing system, modifying the user interface in response to the interaction with the targeted interface object identified by the interaction 3D gesture using the image processing system, rendering the modified user interface using the image processing system, and displaying the rendered user interface using the display.

Still another further embodiment includes a processor, an image capture system configured to capture image data and provide the captured image data to the processor, and memory containing: an operating system; an interactive application; and a 3D gesture tracking application. In addition, the interactive application and the operating system configure the processor to: generate and render an initial user interface comprising a set of interface objects; and modify an initial user interface in response to a detected interaction with a targeted interface object and render an updated user interface. Furthermore the 3D gesture tracking application and the operating system configure the processor to: capture image data using the image capture system; detect a targeting 3D gesture in captured image data that identifies a targeted interface object within a user interface; change the rendering of at least a targeted interface object within a user interface in response to detection of a targeting 3D gesture that targets the interface object; detect an interaction 3D gesture in captured image data that identifies a specific interaction with a targeted interface object; and provide events corresponding to specific interactions with targeted interface objects to the interactive application.

BRIEF DESCRIPTION OF THE DRAWINGS

FIG. 1 is a high level block diagram of a system configured to perform real-time tracking of human hands and provide a gesture based interactive user interface.

FIG. 2 is a high level block diagram of an image processing system in accordance with an embodiment of the invention.

FIGS. 12A and 12B conceptually illustrate the process of scrolling within a user interface.

DETAILED DISCLOSURE OF THE INVENTION

Figure 3:
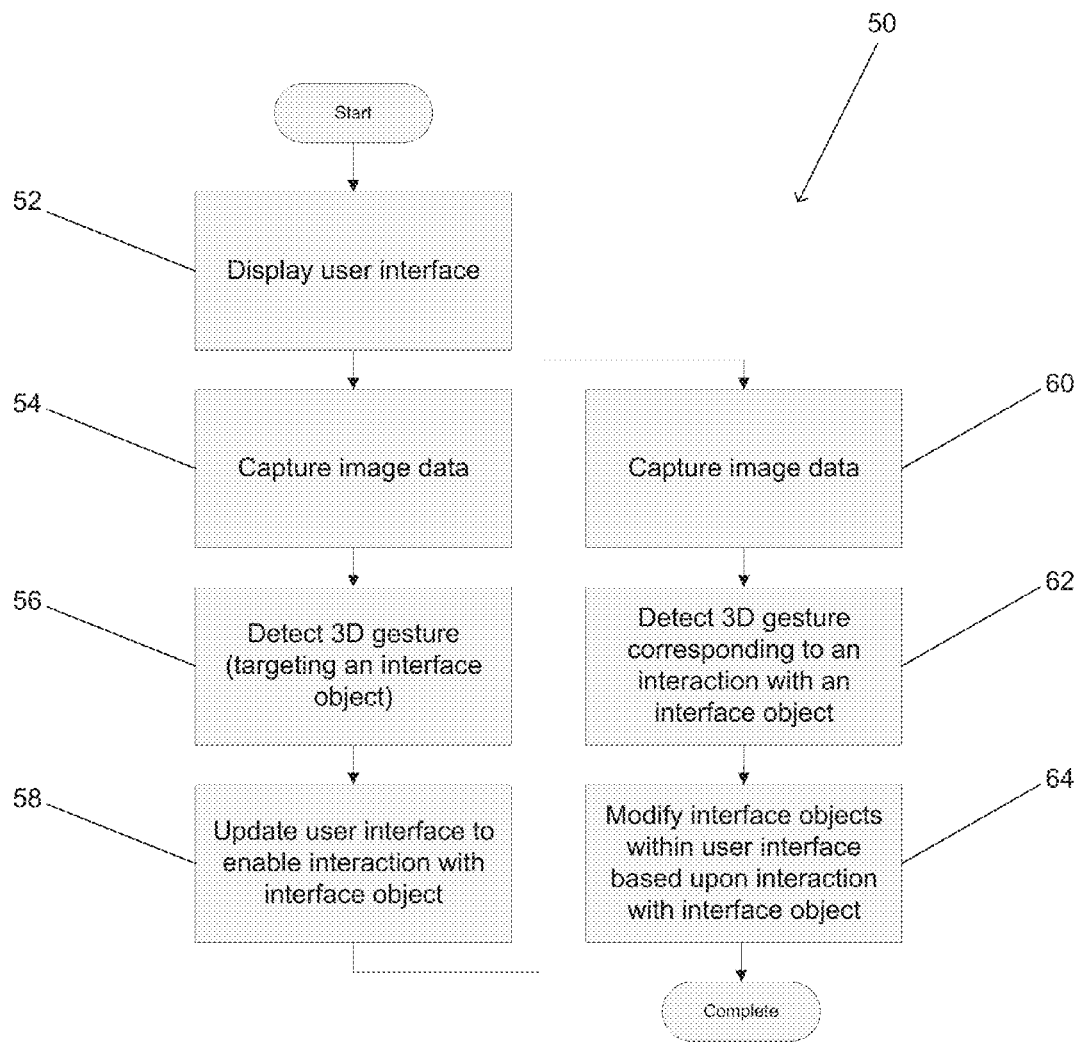
FIG. 3 is a high level flow chart illustrating a process for updating a user interface in response to a 3D gesture to facilitate the user's interaction with an interface object via another 3D gesture in accordance with an embodiment of the invention.

Turning now to the drawings, systems and methods for implementing three-dimensional (3D) gesture based graphical user interfaces (GUI) that incorporate gesture reactive interface objects in accordance with embodiments of the invention are illustrated. Enabling a user to interact with a GUI using natural gestures in 3D space can present particular challenges. Unlike interaction with a pointing device or touch screen, users interact with a 3D gesture based GUI at a distance, and typically rely on visual feedback without the benefit of the tactile sensations obtained from touching an object or moving an object across a surface. Furthermore, 3D gesture input can involve considerably more bio-mechanical effort by a user when compared to other input mechanisms such as touch screens and pointing devices. The fatigue that can be experienced by users of gesture recognition systems that cause users to extend their arms and/or make large movements in order for gestures to be detected has been dubbed "gorilla arm". The systems and methods disclosed in U.S. patent application Ser. No. 13/942,655 entitled "Systems and Methods for Tracking Human Hands using Parts Based Template Matching within Bounding Regions", filed Jul. 15, 2013 and U.S. patent application Ser. No. 13/948,117 entitled "System and Method for Initializing Motion Tracking of Human Hands", filed Jul. 22, 2013 enable the detection of hand gestures within a small 3D interaction zone. By increasing the sensitivity of the gesture detection system to detect smaller gestures, user fatigue when using 3D gestures to interact with a GUI can be reduced. The disclosures of U.S.

patent application Ser. No. 13/942,655 and U.S. patent application Ser. No. 13/948,117 are incorporated by reference herein in their entirety.

A typical user is unable to perform a 3D gesture with the same precision as a 2D gesture. Therefore, a challenge of 3D gesture based user interface design is to enable the user to efficiently and unambiguously interact with a GUI at a distance. The challenge can be particularly acute when attempting to design a user interface that can be utilized for interaction via both 2D and 3D gestures.

3D gesture based GUIs in accordance with many embodiments of the invention include interface objects that react to 3D gestures to simplify the user's interaction with the interface objects. These interface objects can be referred to as gesture reactive interface objects in that the manner in which the interface object is presented to the user and/or the manner in which the user can interact with the interface object changes based upon the 3D gesture input provided by the user. As is discussed further below, many embodiments of the invention achieve a similar effect through continuous substitution of interface objects in response to 3D gesture inputs. As can readily be appreciated, the specific approach that is utilized typically depends upon the requirements of a given application.

For the purpose of the discussion that follows, a gesture reactive interface object can be considered to be a part of a 3D gesture based GUI that can be represented as a graphical element within a display rendered by the GUI. A gesture reactive interface object can define a target zone within the displayed user interface in which a user can initiate actions with respect to the interface object. As is discussed further below, the target zone can be defined independently of the size of the graphical element corresponding to the interface within the GUI and the target zone can itself have an associated graphical element that provides the user with visual feedback when the user approaches and/or encroaches upon the target zone of an interface object. The types of 3D gesture interactions that a user can use to interact with a gesture reactive interface object can be separately specified for each interface object.

In many embodiments, the 3D gesture based GUI includes gesture reactive interface objects that can change the size of displayed graphical elements based upon the distance from the display at which the user is performing the 3D gesture and/or the size and/or resolution of the display. The greater the distance a user is from a given display, the harder it is typically for a user to point at graphical elements on the display and/or the greater the effort for the user to continuously point at a graphical element for an extended period of time. Therefore, including interface objects that react to the distance from the display at which a user is providing 3D gesture input can enable the user to more easily interact with the GUI using 3D gestures at increased distance. Furthermore, interface objects in accordance with many embodiments of the invention can react to the size and/or resolution of a display. In a number of embodiments, the size of graphical elements of interface objects is determined based upon the number of pixels per inch of the display. In other embodiments, any of a variety of criteria related to the size and/or resolution of a display can be utilized to determine the size of graphical elements in a user interface. In certain embodiments, the size and/or resolution of the display is considered in combination with the distance of the user from the display in order to determine the size with which graphical objects within the user interface are presented to the user.

In several embodiments, the target zone of an interface object can be defined independently of the size of the graphical element corresponding to the interface object in the user interface display. In this way, a user can interact with an interface object by pointing at a location on the display that does not contain the graphical element corresponding to the interface object within the GUI. It should be noted that the target zone may include its own graphical element. In which case, the graphical element of the interface object can be thought of as including the graphical element of the target zone. In many embodiments, the GUI can identify the spacing of interface objects and determines the size of the target zone associated with an interface object beyond the size of the graphical element used to represent the interface object within the display. In this way, a user can point at a graphical element with lower accuracy in order to interact with the interface object. In certain embodiments, the size with which the target zone of an interface object is increased is determined based upon the distance from the display at which the user is providing 3D gesture input and/or the size and/or resolution of the display. Accordingly, the 3D gesture based GUI can accommodate the decrease in accuracy with which a user can point at graphical elements on a display that typically occurs as the user moves further from the display. In many embodiments, the GUI increases the size of the target zone of an interface object following the user initiating an interaction with the interface object. In this way, the user can relax the accuracy with which the user is pointing at the display.

As can readily be appreciated, the ability of a 3D gesture based GUI to increase the size of the target zones associated with interface objects within the GUI can be constrained by a variety of factors including (but not limited to) the spacing of interface objects. In a number of embodiments, the 3D gesture based GUI identifies dense groupings of interface objects and automatically zooms a portion of the GUI when a user points at the target zone of any one of the interface objects. In several embodiments, related interface objects are zoomed (e.g. volume and track selection for a music player) irrespective of the spacing of the interface objects. Accordingly, the user interface may zoom a layout of interface objects as opposed to simply a cluster of interface objects. The decision to zoom can be informed by the size of the interface objects, the spacing of the interface objects, the relevance of the interface objects, the distance of the user from the display and/or the size and/or resolution of the display. In certain embodiments, a user can initiate the zooming of a region of the user interface by moving a finger that is pointing at an interface object closer to the interface object to create an effect whereby "pushing" within the target zone of one of a grouping of interface objects causes the grouping of interface objects to increase in size. In other embodiments, any of a variety of gestures can be utilized to initiate zooming of a user interface to facilitate selection of an interface object.

In many applications, benefits can be derived by enabling the user to initiate interaction with a gesture reactive interface object using a first 3D gesture and then enabling the user to continue the interaction with a second 3D gesture. For example, a user can point at a target zone of a gesture reactive interface object to commence scrolling the user interface and, once the interaction is initiated, stop pointing at the target zone and make a second gesture such as (but not limited to) a waving hand motion to continue the scrolling. Allowing the user to relax her or his arm to perform the second gesture can minimize fatigue associated with pointing. Similarly, the manner in which a user selects an interface object (i.e. an action corresponding to a mouse "click") can be gesture reactive. In a number of embodiments, the process of clicking a gesture reactive interface object is initiated by targeting the target zone of an interface object using a pointing 3D gesture for a predetermined period of time. Once the selection process is initiated, the user can cease the pointing 3D gesture and complete the selection by performing a second 3D gesture such as (but not limited to) bending or curling a finger and then straightening the finger in a manner evocative of clicking a mouse or pushing down with the tip of a finger. In many embodiments, the user interface provides visual feedback during the selection process to indicate that the initial 3D gesture has been detected and that a user may perform a second 3D gesture to complete the selection and/or a visual indication of the time available for the user to complete the second 3D gesture to complete the selection. In several embodiments, the user is able to pause for an unconstrained period of time between the initiation of the selection process and performing the second 3D gesture to complete the selection process. In the event that the user decides not to complete the selection process, the user can simply continue interacting with the GUI by pointing at other interface objects and/or can perform a cancelation 3D gesture to terminate the targeting of an interface object.

In several embodiments, the 3D gesture based user interface includes a number of gesture reactive interaction elements that are affordances showing places where the user may interact with the GUI via 3D gesture. An affordance is a visual suggestion of an action that can be performed by the user within the GUI and is typically distinct from a cursor or guidance arrow that indicates the current position and/or action being performed by the user. In many embodiments, the size of the gesture reactive interaction element increases once a user starts interacting with the interaction element. In this way, the user can relax the accuracy with which the user is pointing at the display. In several embodiments, a user's interaction with a gesture reactive interaction element increases the size of the target zone of the interaction element (i.e. the target zone increases in size even though the graphical representation of the interaction element on screen remains the same size) to achieve a similar effect without modification of the display. In many embodiments, targeting of an interaction element that is an affordance enables the selection of the interaction element in a manner similar to that described above with respect to gesture reactive interface objects in general. As such, a user can target an affordance with a first 3D gesture and can initiate an action like scrolling and/or panning (collectively referred to as scrolling herein) using a second interaction 3D gesture.

Systems that utilize 3D gesture based GUIs incorporating gesture reactive interface objects and processes for enabling interaction with gesture reactive interface objects based upon 3D gesture inputs in accordance with embodiments of the invention are discussed further below.

Real-Time Gesture Based Interactive Systems

A real-time gesture based interactive system in accordance with an embodiment of the invention is illustrated in FIG. 1. The real-time gesture based interactive system 10 includes an image processing system 12 configured to receive image data captured by at least one camera 14. In many embodiments, the real-time gesture based interactive system 10 processes the captured image data to determine the location and pose of a human hand. Object detection of human hands can be challenging due to the fact that hands typically have very low texture and are not rigid. In several embodiments, the real-time gesture based interactive system uses a parts based template matching process to detect individual fingers from which hand pose can be inferred in the manner outlined in U.S. patent application Ser. No. 13/899,536. In other embodiments, any of a variety of hand and/or finger tracking techniques can be utilized as appropriate to the requirements of a specific application. Although much of the discussion that follows focuses on 3D gestures made using human hands and human fingers, motion of any of a variety of objects in a predetermined manner can be utilized to perform gesture based interaction with a user interface in accordance with embodiments of the invention.

Based upon the location and pose of a detected human hand, the image processing system can detect 3D gestures including (but not limited to) an initialization gesture indicating that the user is commencing gesture based interaction with the system and gestures that indicate the user's intention to interact with a specific interface object within the user interface. 3D gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures. In a number of embodiments, the real-time gesture based interactive system 10 includes a display 18 via which the real-time gesture based interactive system can present a user interface incorporating gesture reactive interface objects to the user. As noted above, the presentation of gesture reactive interface objects and/or the manner in which a user can interact with the interface objects changes as a reaction or in response to the 3D gesture input provided by the user.

In many embodiments, the manner in which a gesture reactive interface object is displayed within the user interface and/or the size of the target zone associated with the interface object is determined based on a variety of factors including (but not limited to) the distance of the user from the display, the location of the display, the size of the display, the resolution of the display, the displayed content, the provider of the displayed content, and/or user-tunable factors. In other embodiments, the manner in which the gesture reactive interface object is displayed and/or the interactions permitted by the interface object are modified when a user targets the interface object via a 3D gesture. In the context of a real-time gesture based interactive system in accordance with many embodiments of the invention, the concept of targeting an interface object is separate from the concept of selecting the interface object. A 3D gesture that targets an interface object is a 3D gesture that (like a pointing device) points a cursor at an interface object, but does not select the interface object. As discussed further below, many embodiments of the invention utilize a selection process in which an object is targeted by a first targeting 3D gesture, the user interface is modified to inform the user that the object is selectable and/or the time remaining in which the interface object is selectable, and the selection process is completed using a separate second selection 3D gesture. In this way, the user interface is not simply providing a user experience that treats 3D gestures as another form of pointer input, such as the input that would be received via a mouse or a trackpad. Instead, gesture reactive interface objects respond to 3D gestures in a way that provides a user experience in which the process of selecting interface objects is easier and less tiring to complete. The various ways in which gesture reactive user interface elements can be utilized to provide a user experience customized for 3D gesture based interaction in accordance with embodiments of the invention are discussed further below.

Although a specific real-time gesture based interactive system including two cameras is illustrated in FIG. 1, any of a variety of real-time gesture based interactive systems configured to capture image data from at least one view can be utilized as appropriate to the requirements of specific applications in accordance with embodiments of the invention.

Image processing systems in accordance with embodiments of the invention are discussed further below.

Image Processing Systems

Image processing systems in accordance with embodiments of the invention can be implemented using a variety of software configurable computing devices including (but not limited to) personal computers, tablet computers, smart phones, embedded devices and consumer electronics devices such as (but not limited to) televisions, disc players, set top boxes, and game consoles. An image processing system in accordance with an embodiment of the invention is illustrated in FIG. 2. The image processing system 20 includes a processor 22 that is configured to communicate with a camera interface 24 and a display interface 26. The image processing system also includes memory, which can take the form of one or more different types of storage including semiconductor and/or disk based storage. In the illustrated embodiment, the processor 22 is configured using an operating system 30. Where the image processing system is part of an embedded system, the image processing system may not utilize an operating system. Referring back to FIG. 2, the memory 28 also includes a 3D gesture tracking application 32 and an interactive application 34. As is discussed further below, the 3D gesture tracking application can be utilized to process image data received via the camera interface 24 to identify 3D gestures such as hand gestures including initialization gestures and/or the orientation and distance of individual fingers. These 3D gestures can be processed by the processor 22, which can detect an initialization gesture and initiate an initialization process that can involve defining a 3D interaction zone in which a user can provide 3D gesture input to the image processing system. Following the completion of the initialization process, the processor can commence tracking 3D gestures that enable the user to interact with a user interface generated by the operating system 34 and/or the interactive application 34.

In many embodiments the interactive application 34 and the operating system 30 configure the processor 22 to generate and render an initial user interface using a set of interface objects. The interface objects can be modified in response to a detected interaction with a targeted interface object and an updated user interface rendered. Targeting and interaction with interface objects can be performed via a 3D gesture based input modality using the 3D gesture tracking application 32. In several embodiments, the 3D gesture tracking application 32 and the operating system 30 configure the processor 22 to capture image data using an image capture system via the camera interface 24, and detect a targeting 3D gesture in the captured image data that identifies a targeted interface object within a user interface. In addition, the 3D gesture tracking application 32 and the operating system 30 can change the rendering of at least the targeted interface object within the user interface in response to the detection of the targeting 3D gesture. The processor can also be configured to then detect an interaction 3D gesture in captured image data that identifies a specific interaction with the targeted interface object. Based upon the detected interaction 3D gesture, the 3D gesture tracking application and/or the operating system can then provide an event corresponding to the appropriate interaction with the targeted interface objects to the interactive application to enable it to update the user interface in an appropriate manner. Although specific techniques for configuring an image processing system using an operating system, a 3D gesture tracking application, and an interactive application are described above with reference to FIG. 2, any of a variety of processes can be performed by similar applications and/or by the operating system in different combinations as appropriate to the requirements of specific image processing systems in accordance with embodiments of the invention.

In many embodiments, the processor receives frames of video via the camera interface 24 from at least one camera. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible portions of the spectrum including (but not limited to) the infrared near-infrared and ultraviolet portions of the spectrum. In certain embodiments, the image data can be generated based upon electrical signals derived from other sources including but not limited to ultrasound signals. In several embodiments, the received frames of video are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight cameras.

In many embodiments, the display interface 26 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

Although a specific image processing system is illustrated in FIG. 2, any of a variety of image processing system architectures capable of gathering information for performing real-time hand tracking and for updating a displayed user interface in response to detected 3D gestures can be utilized in accordance with embodiments of the invention. Processes for updating user interfaces incorporating gesture reactive interface objects in response to the detection of 3D gesture inputs in accordance with embodiments of the invention are discussed further below.

Updating User Interfaces in Response to 3D Gestures

A variety of characteristics of a 3D gesture can cause the modification of the manner in which a user interface is displayed. In several embodiments, the user interface is updated simply as a function of the detection of input via 3D gesture as opposed to via another input modality. In certain embodiments, detection of a 3D gesture and/or other distance measurement techniques can be used to detect the distance of the user from the display on which the user interface is displayed and to adjust the size of rendered graphical elements and/or target zones of gesture reactive interface objects within the user interface. In this context, gesture reactive interface elements are responding not so much to the specific 3D gesture being detected, but to the distance at which the 3D gesture is being performed. In many embodiments, the manner in which the user interface responds to detection of a 3D gesture is directly related to the specific 3D gesture that is detected. In several embodiments, gesture reactive interface objects within the user interface are configured to react to targeting of the interface object by a 3D gesture. Once targeted, the user interface can change the graphical representation of the interface object, and/or permit additional 3D gesture based interactions with the interface object. Depending upon the configuration of the gesture reactive interface objects, the size of the graphical element and/or target zone of an interface object can increase and/or be zoomed to facilitate the targeting of the interface object and the selection of the interface object can be completed without the need to continue targeting the interface object.

A process for modifying the manner in which gesture reactive interface objects are displayed to a user via a user interface in response to detection of a 3D gesture in accordance with an embodiment of the invention is illustrated in FIG. 3. The process 50 includes displaying (52) an initial user interface and capturing (54) image data. Using the captured image data (56) a 3D gesture can be detected. As noted above, the process of updating the displayed GUI can utilize the 3D gesture to determine the distance of the user from the display on which the user interface is presented. In many embodiments, the 3D gesture can indicate an interface object targeted by the user.

Depending upon the gesture reactive interface elements incorporated in the user interface and/or the detected 3D gesture, the user interface is updated (58) to facilitate interaction with interface objects via 3D gesture inputs. As discussed in detail below, a variety of techniques can be utilized to facilitate interaction with interface objects in accordance with embodiments of the invention including (but not limited to) increasing the size of the graphical element depicting the interface object, increasing the target zone of the interface object, zooming the portion(s) of the user interface containing a layout of interface objects, and/or permitting interactions with the interface object using 3D gestures that do not necessitate the continuous targeting of the interface object.

When the user interface has been updated (58), additional image data can be captured (60) and a 3D gesture corresponding to an interaction with an interface object can be detected. In response to the interaction, the user interface can modified (64) to add and/or remove interface objects to reflect the changes resulting from the interaction (e.g. rendering a new interface page in a web browsing application, or changing the output and/or media being played back in a media player application).

The process for updating a user interface by changing the presentation of gesture reactive interface objects in response to receipt of 3D gestures is distinct from the process of changing the interface objects that are incorporated in the user interface in response to an interaction with an interface object via a 3D gesture. When a user interface is updated to change the presentation of gesture reactive interface objects in response to a 3D gesture, the user interface is typically rendered from the same set of interface objects. The 3D gesture is simply causing specific interface objects within the user interface to be rendered in a different manner. Changing the set of interface objects also modifies the manner in which a user interface is rendered. The modification is due to the different combination of interface objects from which the user interface is rendered and not due to changes in the manner in which the same combination of gesture reactive interface objects are rendered.

While there are many benefits to utilizing gesture reactive interface objects to enable updating of a user interface in a manner that is responsive to 3D gestures, the process of updating a user interface in response to a 3D gesture can involve substituting interface objects in a manner that emulates a gesture reactive interface object. In several embodiments, a management process continuously monitors received 3D gesture inputs and substitutes interface objects within the user interface to modify the presentation of the user interface in response to the 3D gesture. Accordingly, characteristics of the interface objects such as the size of graphical elements and/or target zones are not changing. Instead, interface objects with different sized graphical elements and/or target zones are substituted in response to received 3D gestures. As can be readily appreciated, utilizing gesture reactive interface objects is similar to the use of a management process that substitutes interface objects in response to 3D gestures. While much of the discussion contained herein references the use of gesture reactive interface objects, the specific approach that is utilized is typically dependent upon the requirements of a given application. Accordingly, the various systems and processes described herein that incorporate the use of gesture reactive interface objects should be understood as also capable of implementation using interface object substitution in accordance with embodiments of the invention.

Although specific processes for modifying a user interface in response to 3D gestures to facilitate interaction with interface objects within the user interface are described above with respect to FIG. 3, any of a variety of processes specific to particular 3D gestures and/or particular configurations of gesture reactive interface objects appropriate to the requirements of specific applications can be utilized in accordance with embodiments of the invention. Process for modifying the size with which gesture reactive interface objects are graphically represented within a user interface in response to detection of 3D gestures in accordance with embodiments of the invention are discussed further below.

Modifying the Size of the Graphical Elements of Gesture Reactive Interface Objects In many embodiments, the manner in which a user interface is rendered can depend upon a variety of factors including (but not limited to) the type of device, the size of the display, the resolution of the display, and/or the distance of the user from the display. In several embodiments, an initial user interface configuration is determined based upon characteristics of the device including (but not limited to) the type of device, the size of the display, the resolution of the display, and/or a default set or user defined set of user interface configuration characteristics. Based upon these factors, the interface objects within the user interface can be rendered for display. In a number of embodiments, the manner in which the user interface is rendered is updated in response to the detection of a 3D gesture input. In certain embodiments, the detection of a 3D gesture input prompts the determination of the distance of the user from the display and the distance is used to modify the rendering of gesture reactive interface objects within the user interface. In many embodiments, the size of the rendered graphical elements for each gesture reactive interface element and/or the size of the target zone of the interface object are modified. In several embodiments, the increase in size of the rendered graphical elements and/or target zones of interface objects is not a function of distance but simply a function of the detection of a 3D gesture input as opposed to another input modality such as (but not limited to) a pointing device, or touch interface.

Figure 4:
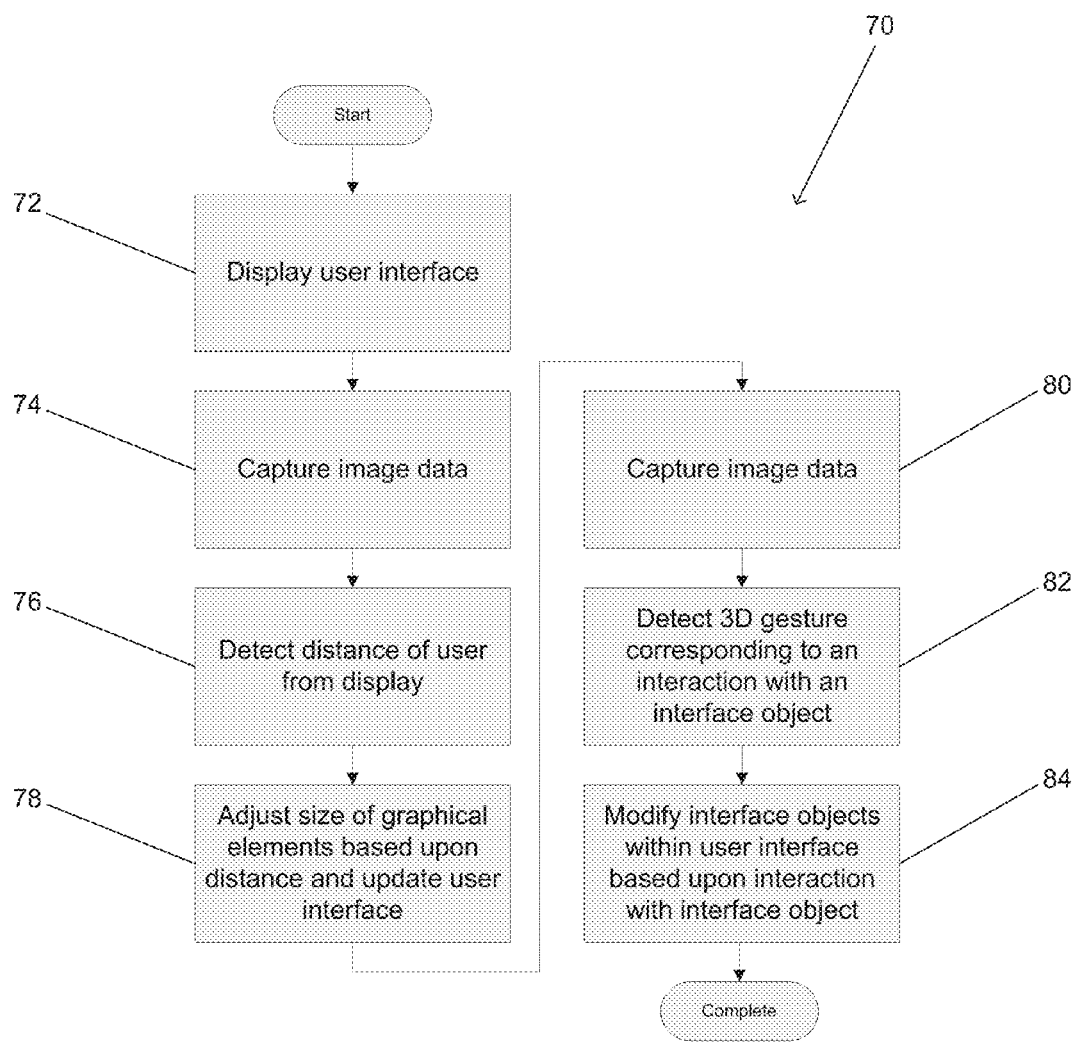
FIG. 4 is a flow chart illustrating a process for determining the size of graphical elements within a user interface based upon the distance of a user from a display in accordance with an embodiment of the invention.

A process for modifying the size of rendered graphical elements of gesture reactive interface objects within a user interface based upon the distance of a user from a display in accordance with an embodiment of the invention is illustrated in FIG. 4. The process 70 includes displaying (72) a user interface. As described above, the characteristics of the rendering of the initial user interface can be determined based upon a variety of factors including (but not limited to) the type of device, the size of the display, the resolution of the display, and/or a default set or user defined set of user interface configuration characteristics. Image data is captured (74). The presence of a user can be detected based upon a variety of criterion including (but not limited to) detection of a wakeup 3D gesture, face detection, and/or head detection. The captured image data can be utilized to determine (76) the distance of the user from the display and to adjust (78) the size of graphical elements within the rendered user interface. In a number of embodiments, the image capture system that captures image data is not collocated with the display and a configuration process can be utilized to determine the spatial relationship between the image capture system and the display. Once the distance of the user from the display is determined, the size of rendered graphical elements corresponding to gesture reactive interface objects within the user interface. Alternatively, a management process can substitute interface objects for equivalent interface objects in which the associated graphical element has a size determined based upon the distance of the user from the display.

The process continues to capture (80) image data and 3D gestures corresponding to interactions with interface objects can be detected (82). Based upon the interactions, the application can modify (84) the interface objects used to render the user interface. In this way, the process 70 illustrated in FIG. 4 can be repeated to enable continuous adaptation of the size of the graphical elements within a display in response to the distance of the user from the display as the user interacts with interface objects within the user interface via 3D gestures.

Although the above discussion of FIG. 4 references distance of the user from a display, as can be readily appreciated the distance of a user from any of a variety of arbitrary points can be utilized as a proxy for distance from the user to the display and/or as a basis for modifying the size of the graphical elements within displayed user interface. Furthermore, embodiments of the invention are not limited to the specific process for modifying the size of graphical elements in a rendered user interface based upon detection of 3D gesture input illustrated in FIG. 4. Indeed, any of a variety of processes appropriate to the requirements of specific applications can be utilized to modify the size of graphical elements in a rendered user interface based upon the distance of a user to a display in accordance with embodiments of the invention.

Figure 5A:
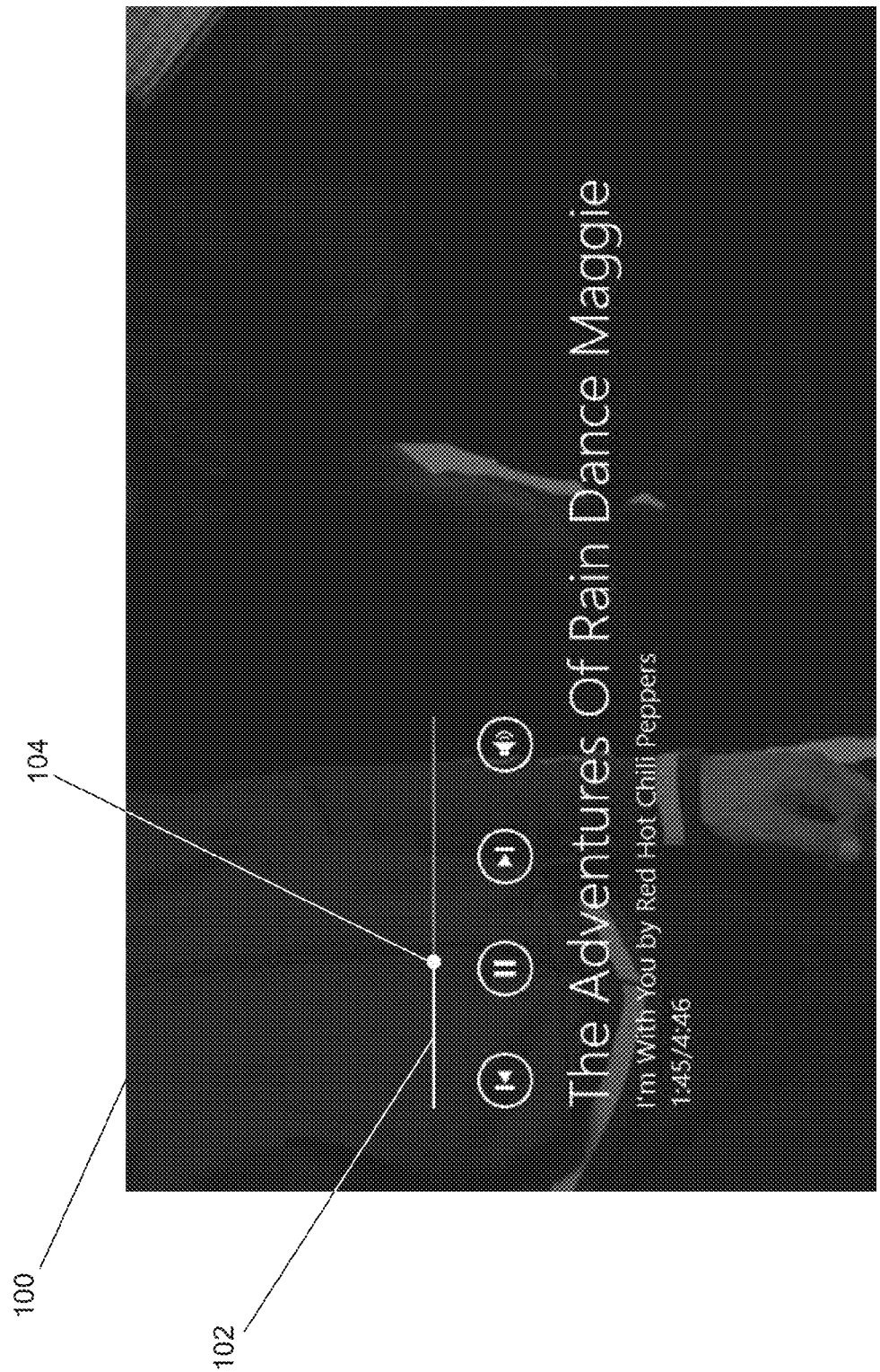
FIGS. 5A and 5B conceptually illustrate the modification of the size of graphical elements within a user interface in accordance with an embodiment of the invention.
Figure 5B:
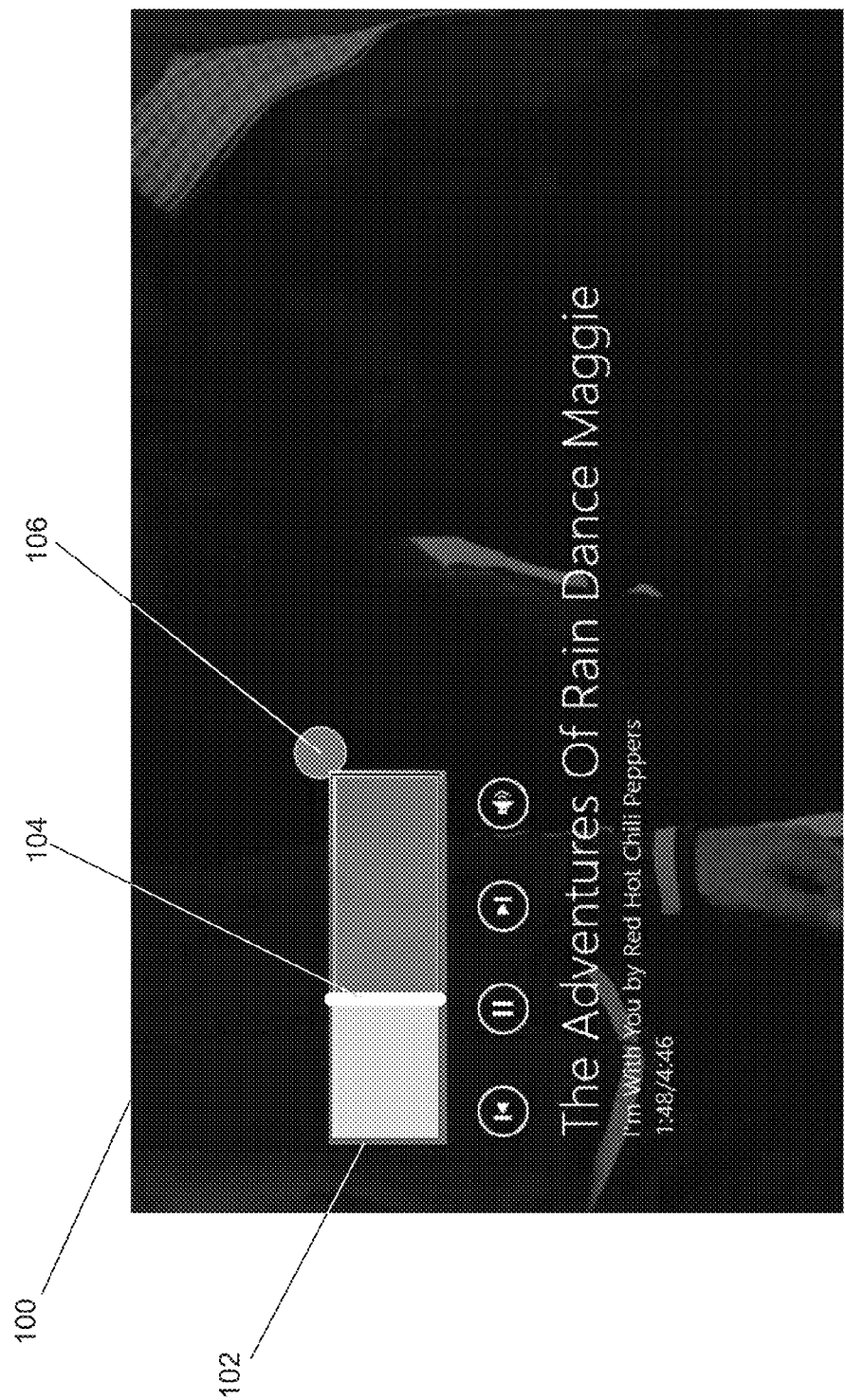

The manner in which the size of graphical elements within a rendered user interface can change in response to 3D gesture input in accordance with an embodiment of the invention is illustrated in FIGS. 5A and 5B. Referring to FIG. 5A, a media player user interface 100 is shown that includes a content timeline 102 and slider 104 graphical element corresponding to a timeline scrubber gesture reactive user interface element that indicates current playback location. A user can manipulate the playback location by selecting and moving the slider 104 relative to the content timeline 102. In response to receipt of input via a 3D gesture based input modality, and/or detection of the distance of the user from the display, the size of the content timeline 102 and the slider 104 can increase.

FIG. 5B conceptually illustrates the manner in which the sizes of graphical elements within a user interface can be increased in response to receipt of a pointing 3D gesture input (indicated by a cursor 106). As can be readily appreciated, the increased size of the content timeline 102 and the slider 104 graphical elements makes them easier for the user to target. As noted above, many embodiments of the invention determine the size of the displayed graphical elements based upon the distance of the user from the display. While much of the discussion above relates to determining the size of the rendered graphical elements within a user interface based upon the distance of the user from the display, the size of the rendered graphical elements may be increased simply as a function of the use of 3D gestures to provide input as opposed to another input modality (e.g. a pointing device or a touch interface).

In many embodiments, once the slider is targeted the user can interact with the slider via a pointing 3D gesture directed anywhere on the display. In this way, the target zone of the timeline scrubber gesture reactive interface object is increased in response to an initial targeting to facilitate interaction with the slider. The manner in which the target zone of an interface object can be increased to facilitate user interaction with the interface object in accordance with embodiments of the invention is discussed further below.

Modifying the Size of the Target Zone of Gesture Reactive Interface Objects

In the same way in which the size of graphical elements within a user interface can be modified in response to 3D gesture input, the size of target zones of gesture reactive interface objects within a user interface can also change based upon factors including (but not limited to) the type of device, the size of the display, the resolution of the display, and/or the distance of the user from the display. As discussed above, the initial size of the target zones of gesture reactive interface objects within the user interface can be determined based upon a variety of factors unrelated to the user. When the presence of a user is detected, the size of the target zones can be modified based upon the distance of the user from the display to facilitate the user's interaction with interface objects within the user interface. In several embodiments, the increase in size of target zones of interface objects is not a function of distance but simply a function of the detection of 3D gesture input as opposed to another input modality such as (but not limited to) a pointing device, or touch interface.

Figure 6:
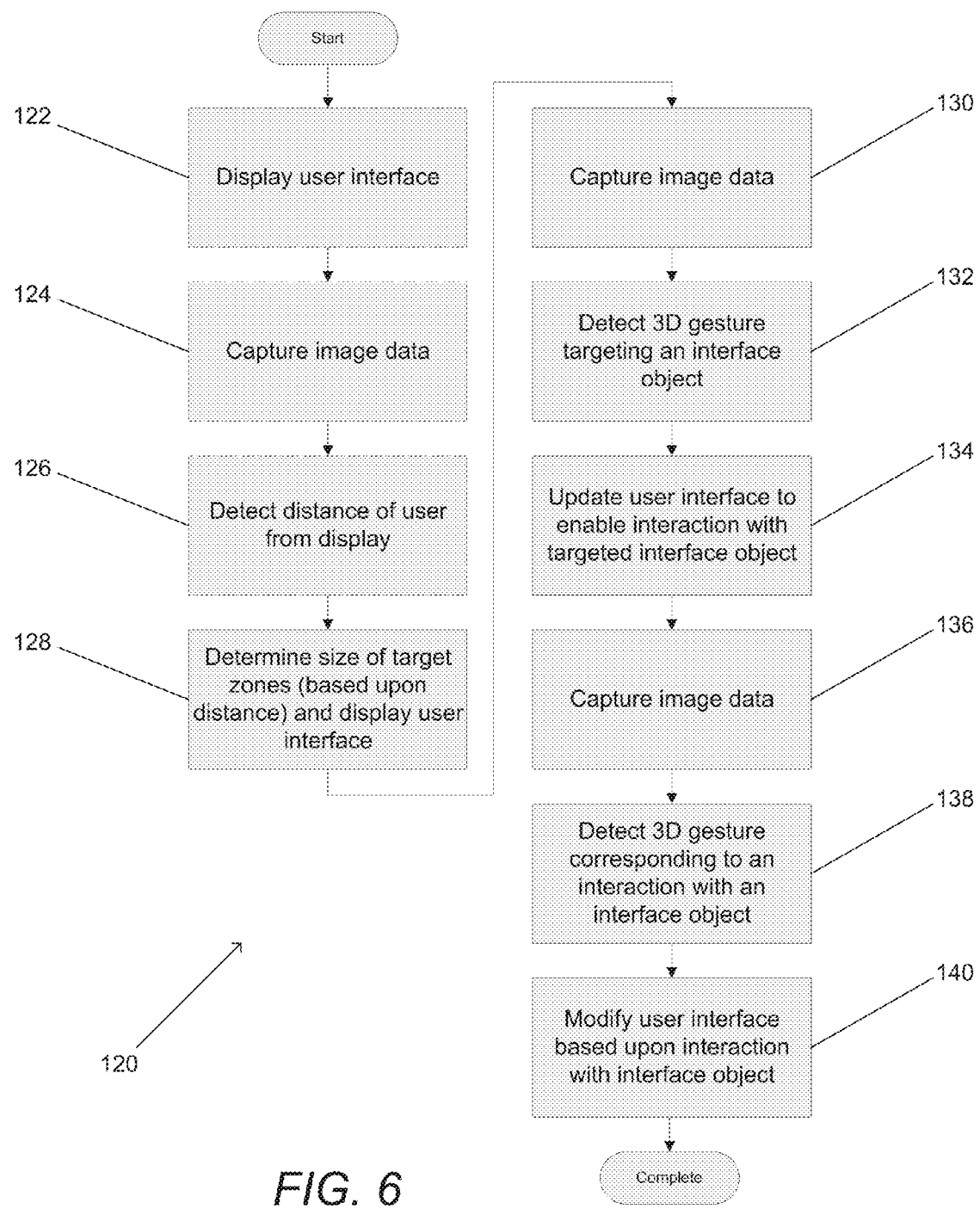
FIG. 6 is a flow chart illustrating a process for determining the size of target zones of interface objects in a user interface based upon the distance of a user from a display in accordance with an embodiment of the invention.

A process for determining the size of target zones for interface objects within a user interface based upon the distance of a user from a display and receiving 3D gesture based input involving interactions with interface objects within the target zones in accordance with an embodiment of the invention is illustrated in FIG. 6. The process 120 optionally includes displaying (122) a user interface, capturing image data (124) and determining (126) the distance of the user from the display in a similar manner to that described above with respect to FIG. 4. As can readily be appreciated, the distance of a user from a display may only need to be performed once or infrequently during a gesture based interactive session. Where the optional portions of the process 120 are performed, the distance of the user from the display is used to adjust (128) the size of the target zones of gesture reactive interface objects within the user interface. Alternatively, receipt of input via 3D gesture (as opposed to via another input modality) can cause the user interface to increase (128) the size of the target zones of interface elements within the user interface to facilitate user interaction via 3D gesture.

The process continues to capture (130) image data so that 3D gestures targeting interface objects can be detected (132).

The targeting of an interface object typically does not constitute an interaction with the interface object. Rather the targeting of the interface object can enable or unlock the capability of a user to interact with the interface object. Accordingly, the user interface can be (optionally) updated (134) based upon the characteristics of the targeted interface object in any of a variety of manners including (but not limited to) the techniques described below for facilitating interaction with the targeted interface object. In several embodiments, the updating of the user interface can be as simple as displaying a graphical element corresponding to the target zone for the targeted interface object and/or highlighting the graphical element of the targeted interface object. In many embodiments, the targeting of a gesture reactive interface object may unlock the ability for the user to interact with the interface object using one or more 3D gestures.

As an interface object is targeted (132), the process continues capturing (136) image date and can detect (138) a 3D gesture corresponding to an interaction with the targeted interface object. Based upon the interactions, the application can modify (140) the interface objects used to render the user interface. In this way, the process 120 illustrated in FIG. 6 can be repeated to enable continuous adaptation of the size of the target zones of interface objects within a user interface in response to the distance of the user from the display as the user interacts with interface objects within the user interface via 3D gestures.

Although the above discussion of FIG. 6 references distance of the user from a display, as can be readily appreciated the distance of a user from any of a variety of arbitrary points can be utilized as a proxy for distance from the user to the display and/or as a basis for modifying the size of the graphical elements within displayed user interface. Furthermore, embodiments of the invention are not limited to the specific process for modifying the size of target zones of interface objects within a user interface based upon the distance of a user to a display illustrated in FIG. 6. Indeed, any of a variety of processes appropriate to the requirements of specific applications can be utilized to modify the size of target zones of interface objects within a user interface in accordance with embodiments of the invention.

Figure 7A:
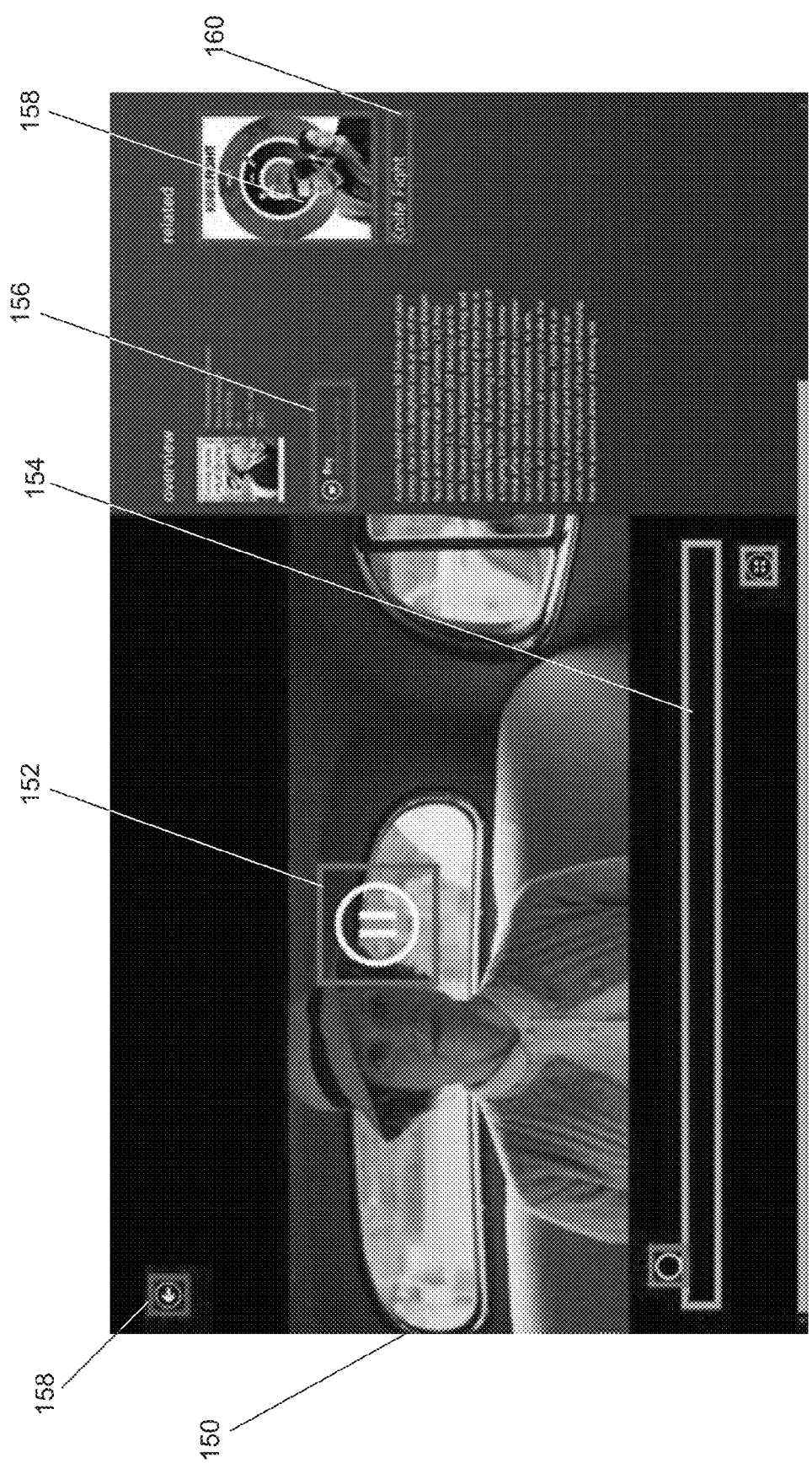
FIGS. 7A and 7B conceptually illustrate the modification of graphical elements indicating target zones of interface objects within a user interface in accordance with an embodiment of the invention.
Figure 7B:
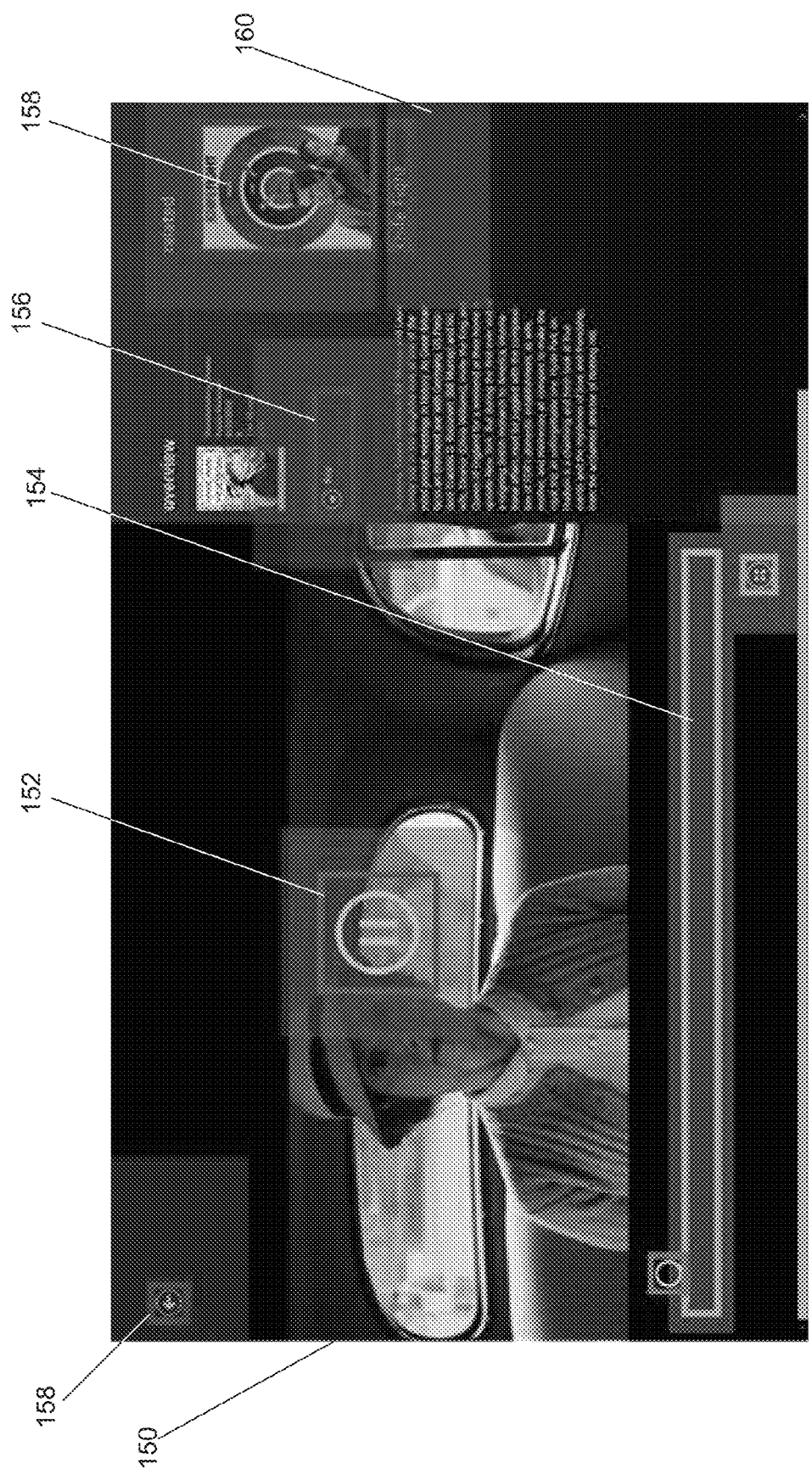

The manner in which the size of target zones within a rendered user interface can change in response to 3D gesture input in accordance with an embodiment of the invention is illustrated in FIGS. 7A and 7B. In the illustrated embodiment, the target zones are indicated within the user interface using graphical elements that communicate to the user when the user is targeting an interface object. In other embodiments, a graphical element corresponding to the target zone for an interface element is only rendered when the user approaches and/or encroaches upon the target zone. With specific reference to FIG. 7A, a display 150 including a number of gesture reactive interface objects (152, 154, 156, 158, 160) with which a user can interact are shown. Upon detection of the commencement of 3D gesture based interaction with the user interface, the size of the target zones for the interface objects can be determined and or displayed. In FIG. 7B, the sizes of the target zones of the interface elements (152, 154, 156, 158, 160) within the user interface are indicated using corresponding transparent graphical elements. When the system detects a pointing 3D gesture that is pointing at one of the target zones, the user can provide additional 3D gesture inputs to interact with the targeted interface object. In alternative embodiments, a graphical element indicating the size of a target zone for an interface element is only displayed when the user approaches within a predetermined threshold distance from the edge of a target zone and/or when the uses encroaches on the target zone of an interface object. In several embodiments, the target zones are not displayed and the user interface simply highlights the graphical element of the interface object when the user performs a pointing 3D gesture directed toward the target zone of the interface object. While much of the discussion above relates to determining the size of the target zones based upon the distance of the user from the display, the size of the target zones may be increased as a function of the use of 3D gestures to provide input as opposed to another input modality (e.g. a pointing device or a touch interface).

Simplifying Interaction with Targeted Interface Objects

Users are typically much less precise with targeting a pointing 3D gesture than they are with providing touch inputs and/or using pointing devices. Systems in accordance with many embodiments of the invention can modify the characteristics of interface objects targeted by 3D gestures to simplify user interaction with the targeted interface objects. In many embodiments, the user interface responds to the targeting of a gesture reactive interface object by automatically increasing the size of the rendered graphical element of the interface object and/or a group or layout of related interface objects within the user interface. Increasing the size of an interface object and/or a group or layout of related interface objects can assist the user in targeting a specific interface object of interest. In a number of embodiments, the user interface changes the manner in which 3D gestures are mapped to locations on the display to slow the movement of a cursor in response to the initial targeting of an interface object. In this way, it is easier for a user to continue targeting an interface object for a sufficient period of time to enable the user to interact with the interface object and/or confirm the user's intention to interact with the interface object.

Figure 8:
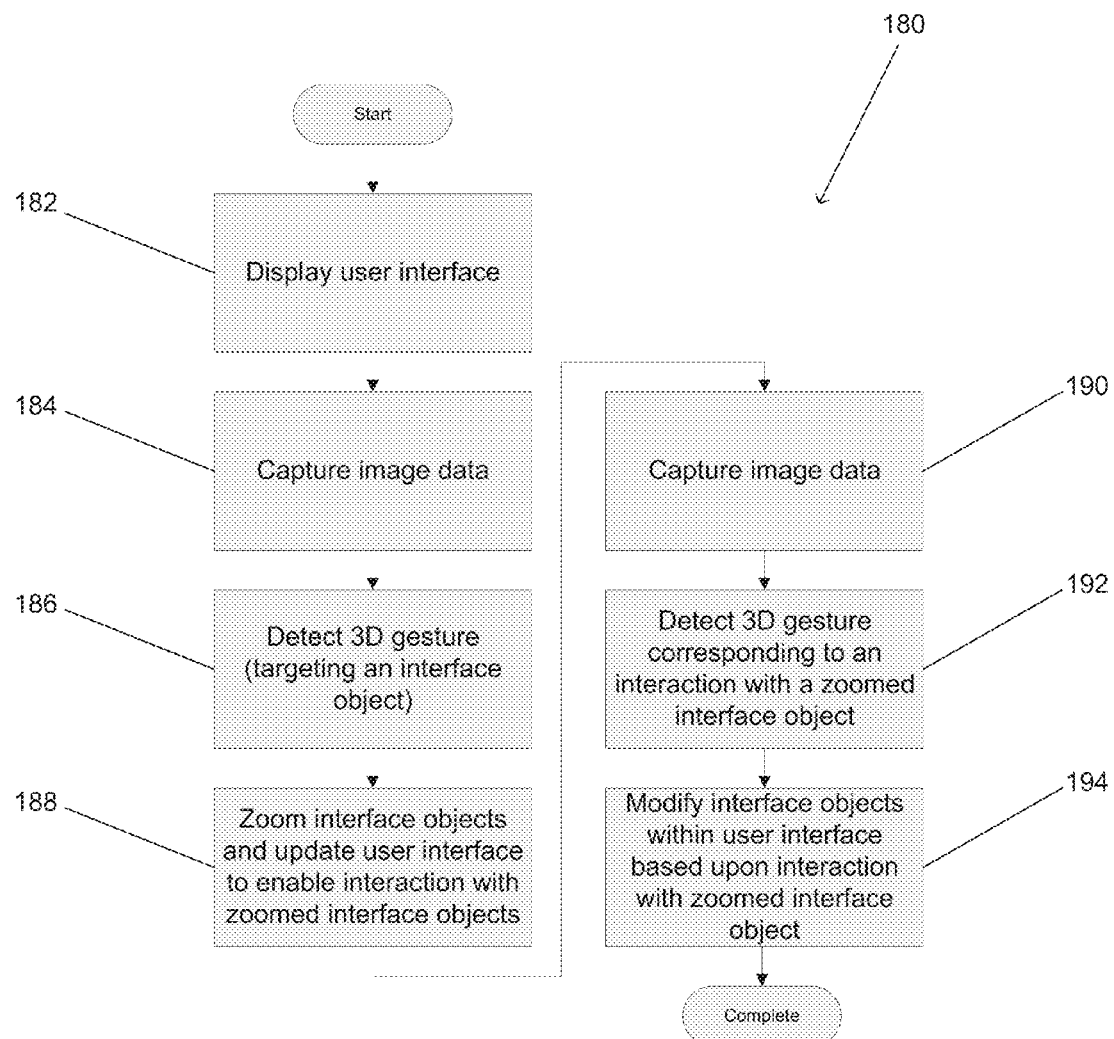
FIG. 8 is a flow chart illustrating a process for zooming interface objects based upon the targeting of one of the interface objects via a 3D gesture in accordance with an embodiment of the invention.

A process for increasing the size of rendered graphical elements of gesture reactive interface objects within a user interface in response to targeting of an interface object using a 3D gesture input in accordance with an embodiment of the invention is illustrated in FIG. 8. The process 180 includes displaying (182) a user interface that may include one or more gesture reactive interface objects, and capturing image data (184). The captured image data can be utilized to detect (186) a 3D gesture targeting an interface object. In several embodiments, the size of the rendered graphical element of the targeted interface object is increased or "zoomed" (188). In many embodiments, the user interface includes metadata that identifies groups or layouts containing related interface objects and the targeting of an interface object causes the zooming of the group of related interface elements and/or the layout containing the group of related interface objects. The process continues (190) to capture image data to detect (192) a 3D gesture corresponding to an interaction with a zoomed interface object. Based upon the interactions, the application can modify (192) the interface objects used to render the user interface. In this way, the process 180 illustrated in FIG. 8 can be repeated to enable continuous zooming of interface objects within a user interface in response to targeting of interface objects via 3D gestures.

Although the above discussion of FIG. 8 references zooming interface objects, as can be readily appreciated other techniques for simplifying a user's 3D gesture based interaction with a targeted interface object can be utilized including (but not limited to) slowing or damping 3D gesture input in response to the targeting of an interface object to facilitate the continued targeting of and/or interaction with the interface object. This can be achieved by temporarily changing the mapping between the 3D interaction zone in which a user can provide 3D gesture input and the display. Furthermore, embodiments of the invention are not limited to the specific process for updating a user interface in response to the targeting of an interface object via a 3D gesture illustrated in FIG. 8. Indeed, any of a variety of processes appropriate to the requirements of specific applications can be utilized to update a user interface in response to the targeting of an interface object via a 3D gesture in accordance with embodiments of the invention.

Figure 9A:
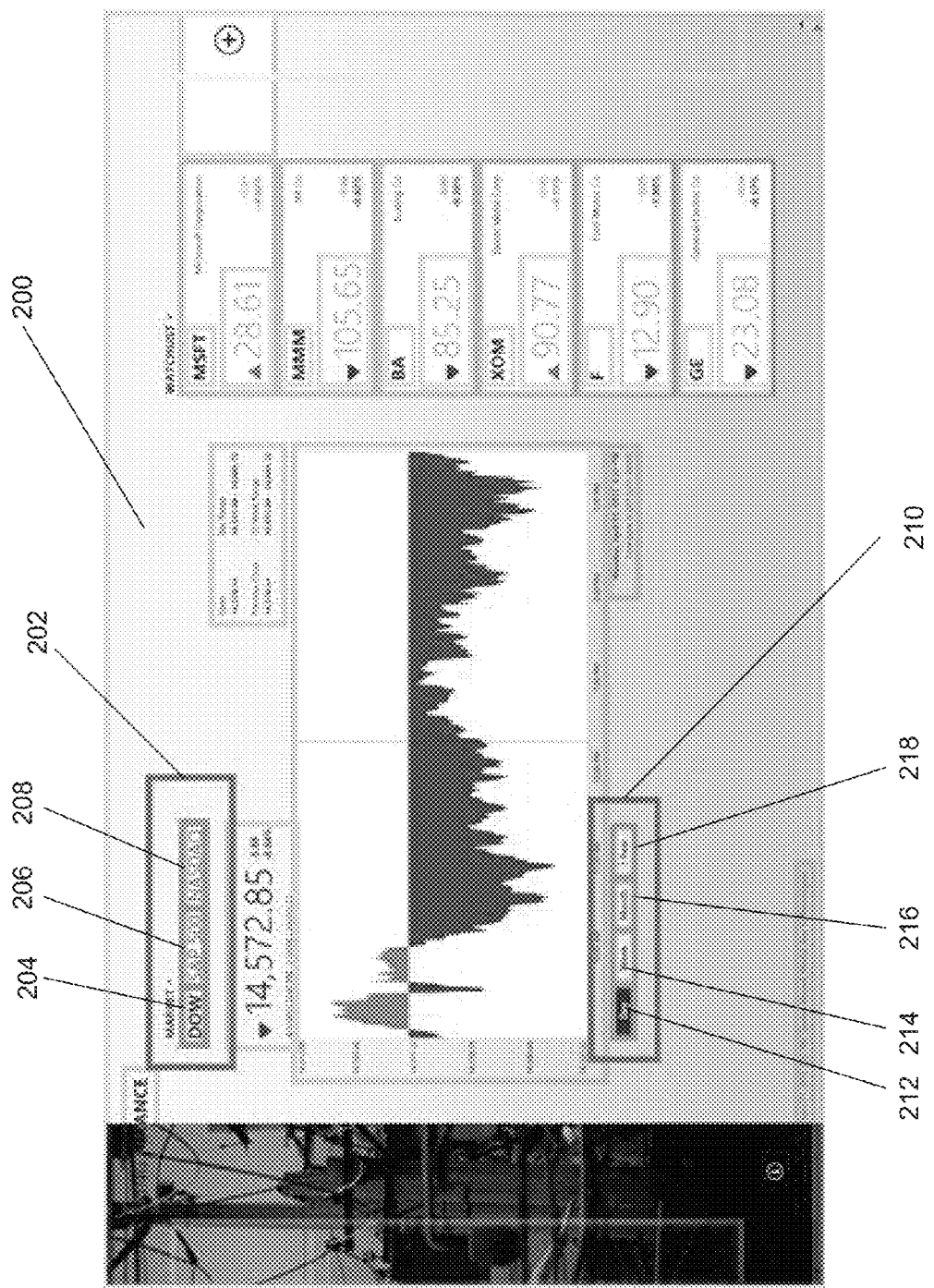
FIGS. 9A and 9B conceptually illustrate the zooming of interface objects based upon the targeting of one of the interface objects via a 3D gesture in accordance with an embodiment of the invention.
Figure 9B:
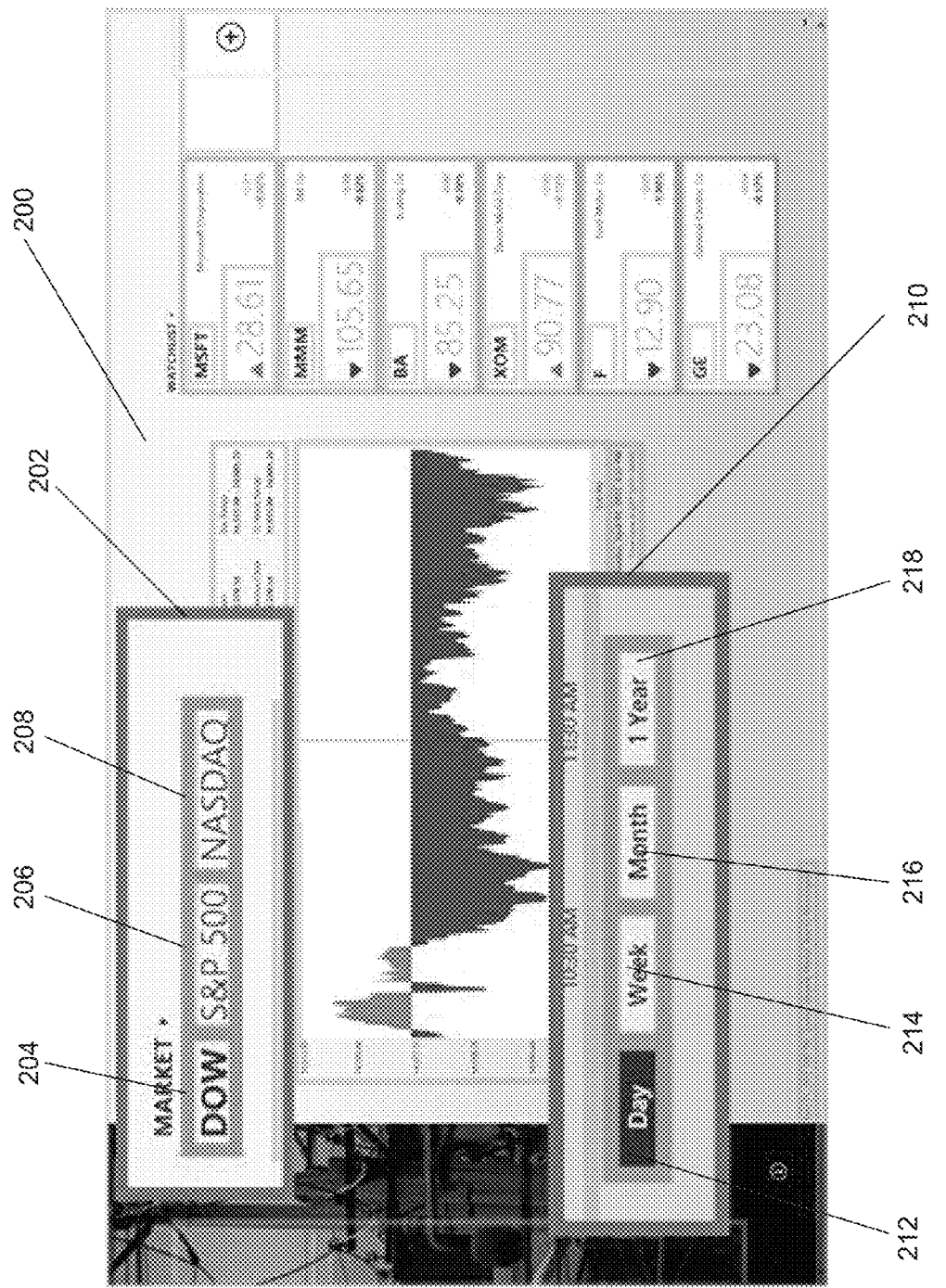

The updating of a user interface in response to the targeting of an interface object via a 3D gesture is illustrated in FIGS. 9A and 9B. In the illustrated embodiment, targeting of the target zone of an interface object within a layout causes the zooming of the entire layout to facilitate interaction with individual interface objects within the layout. Referring to FIG. 9A, a display 200 including stock ticker information is illustrated. The display includes a first group of interface elements 202 enabling the user to select between the display of the three stock indices (204, 206, 208). A second group of interface elements 210 specifies the time period displayed (212, 214, 216, 218). A 3D gesture that targets either the first or second group of interface objects causes the zooming of both groups of interface objects. The zooming of the groups of interface objects is illustrated in FIG. 9B. In a number of embodiments, the zooming persists for a predetermined period of time deemed sufficient to enable the user to interact with one of the interface objects. In this way, hand tremor that results in the user leaving the target zone does not result in the reduction in the size of the rendered graphical elements. As can readily be appreciated, the zooming can be accompanied by a slowing or damping of the 3D gesture input within the zoomed regions of the user interface to allow the user greater control over the targeting of interactions with individual interface objects. While much of the discussion above relates to facilitating interaction with targeted interface objects and/or groups or layouts or related interface objects, many embodiments perform zooming of interface objects in response to the detection of 3D gesture input (as opposed to another input modality) and irrespective of whether the user is targeting one of the interface objects or groups of interface objects. In this way, the graphical elements of interface objects can be rendered in a manner that is more suited to 3D gesture based interaction in response to the user initiating a 3D gesture based interactive system with the user interface. Furthermore, in several embodiments zooming is not automated but is initiated via a zooming interaction with an interface object. Examples of 3D gestures that can be utilized to perform zooming interactions include (but are not limited to) pushing on the target zone of an interface object.

Interacting with Gesture Reactive Interface Objects

Many of the techniques described above simplify the ability of a user to target a specific interface object within a user interface when providing input via 3D gesture. The use of gesture reactive interface objects in accordance with many embodiments of the invention can also simplify the process of interacting with a targeted interface object. In many embodiments, an initial targeting of an interface object can unlock the ability of the user to interact with the targeted interface object via one or more predetermined 3D gestures. Furthermore, the 3D gestures used to interact with the interface object need not require pointing to the target zone of the interface object. Where continued pointing is required to interact with the interface object, techniques to simply the interaction can be utilized including (but not limited to) increasing the size of the target zone of the interface object after an initial period of targeting to reduce the fatigue associated with attempting to point accurately at the display for an extended period of time. A benefit of using a two step process to interact with interface objects is that unintended gestures/interactions (i.e. user behavior that unintentionally involves performing a 3D gesture triggering an interaction with an interface object) can be reduced. A user is made aware of the inadvertent targeting of an interface object and can perform a cancelation 3D gesture or simply wait for the targeting of the interface object to expire in order to avoid performing an interaction and to continue interacting with the user interface. As can readily be appreciated, users can interact with interface objects in a variety of ways. Techniques for selecting, and scrolling interface objects in accordance with embodiments of the invention are described below. However, the processes and techniques described herein can be extended to any form of interaction with an interface object such as (but not limited to) zooming the interface object.

Selecting Interface Objects

In many applications, benefits can be derived by enabling the user to initiate interaction with a gesture reactive interface object using a first 3D gesture and then enabling the user to continue the interaction with a second 3D gesture. For example, a user can point at the target zone of an interface object for a predetermined period of time to select the object and make a second gesture to select the object such as (but not limited to) a tapping gesture involving lowering and raising a finger. Allowing the user to relax her or his arm to perform the second gesture can minimize fatigue associated with pointing. In many embodiments, the user interface provides visual feedback during the selection process to indicate that the initial 3D gesture has been detected and that a user may perform a second 3D gesture to complete the selection and/or a visual indication of the time available for the user to complete the second 3D gesture to complete the selection. In several embodiments, the user is able to pause for an unconstrained period of time between the initiation of the selection process and performing the second 3D gesture to complete the selection process. In the event that the user decides not to complete the selection process, the user can simply continue interacting with the GUI by pointing at other interface objects. In certain embodiments, the initial process of targeting an interface object can incorporate hysteresis to disregard hand tremors that briefly cause a cessation in targeting.

Figure 10:
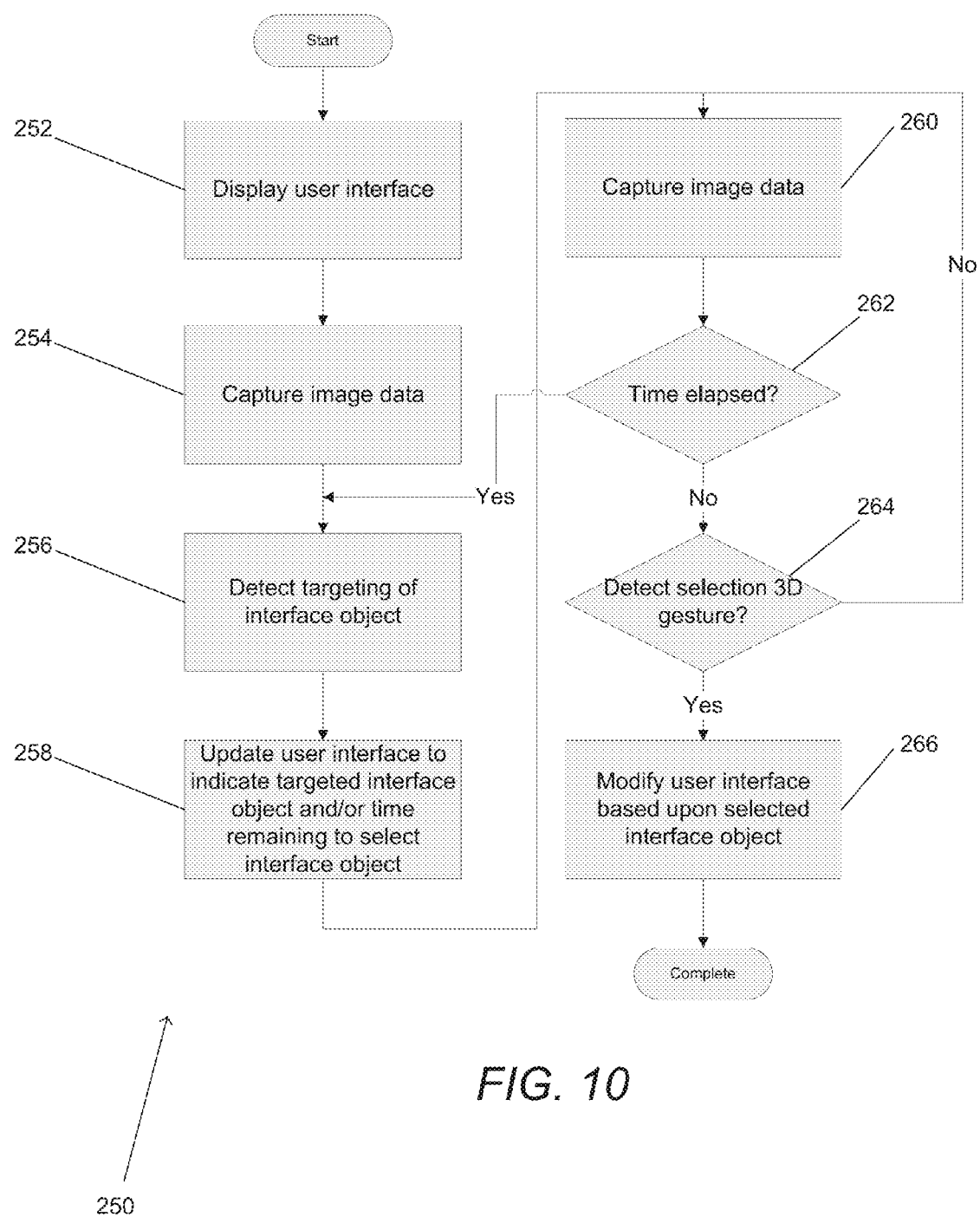
FIG. 10 is a flow chart illustrating a process for detecting a 3D gesture targeting an interface object, updating the user interface to provide a notification that the targeted interface object is selectable and/or the period of time remaining in which the targeted interface object can be selected via a second 3D gesture, and detecting a 3D gesture selecting the interface object in accordance with an embodiment of the invention.

A process for detecting a 3D gesture targeting an interface object, modifying the user interface to provide a notification that the targeted interface object is selectable and/or the period of time remaining in which the interface object can be selected via a second 3D gesture, and detecting a 3D gesture selecting the interface object in accordance with an embodiment of the invention is illustrated in FIG. 10. The process 250 includes displaying (252) a user interface, capturing (254) image data and detecting (256) targeting of an interface object within the user interface using a pointing 3D gesture that persists for a predetermined period of time. As noted above, the process of determining whether the 3D gesture persists for a predetermined period of time may include hysteresis to account for tremors that reduce the accuracy with which a user can point via 3D gesture at an interface object for an extended period of time.

The process updates (258) the user interface to provide visual feedback that the targeted interface object is now capable of selection. The visual feedback can include highlighting the interface object. In several embodiments, the user interface also displays the time remaining for the user to select the interface object. At which point, the targeted interface object can now be selected via a second selection 3D gesture that need not involve continued pointing at the interface object. Examples of gestures that can be used to select a targeted interface object include (but are not limited to) performing a clicking gesture (curling a finger and straightening the finger in a manner evocative of clicking down on a mouse), a tapping gesture (moving a finger down and up in a manner evocative of tapping a virtual screen or virtual plane), and/or a wiggle gesture (moving the finger back and forth or up and down). As can readily be appreciated different 3D gestures including different motions and/or different 3D gestures including similar motions but incorporating different numbers of fingers can be utilized to select and/or interact with interface objects in different ways.

In order to detect the selection of the targeted interface object, the process 250 captures (260) image data for a predetermined period of time (262) to determine (264) whether the user has performed a selection 3D gesture. In many embodiments, the process supports the cancellation of the targeting of an interface object by performing a cancelation 3D gesture to terminate the targeting of the interface object. Based upon the selected interface object, the application can modify (266) the interface objects used to render the user interface. In this way, the process 250 illustrated in FIG. 10 can be repeated to enable continuous selection of interface objects within a user interface via 3D gestures.

Although the above discussion of FIG. 10 references selection of interface objects, as can be readily appreciated other types of interactions with interface objects can be performed by targeting an interface object with a targeting 3D gesture for a first predetermined period of time and then performing a second interaction 3D gesture within a second predetermined period of time. Furthermore, embodiments of the invention are not limited to the specific process for selecting an interface object via a sequence of 3D gestures illustrated in FIG. 10. Indeed, any of a variety of processes appropriate to the requirements of specific applications can be utilized to select an interface object using a sequence of two or more 3D gestures in accordance with embodiments of the invention.

Figure 11A:
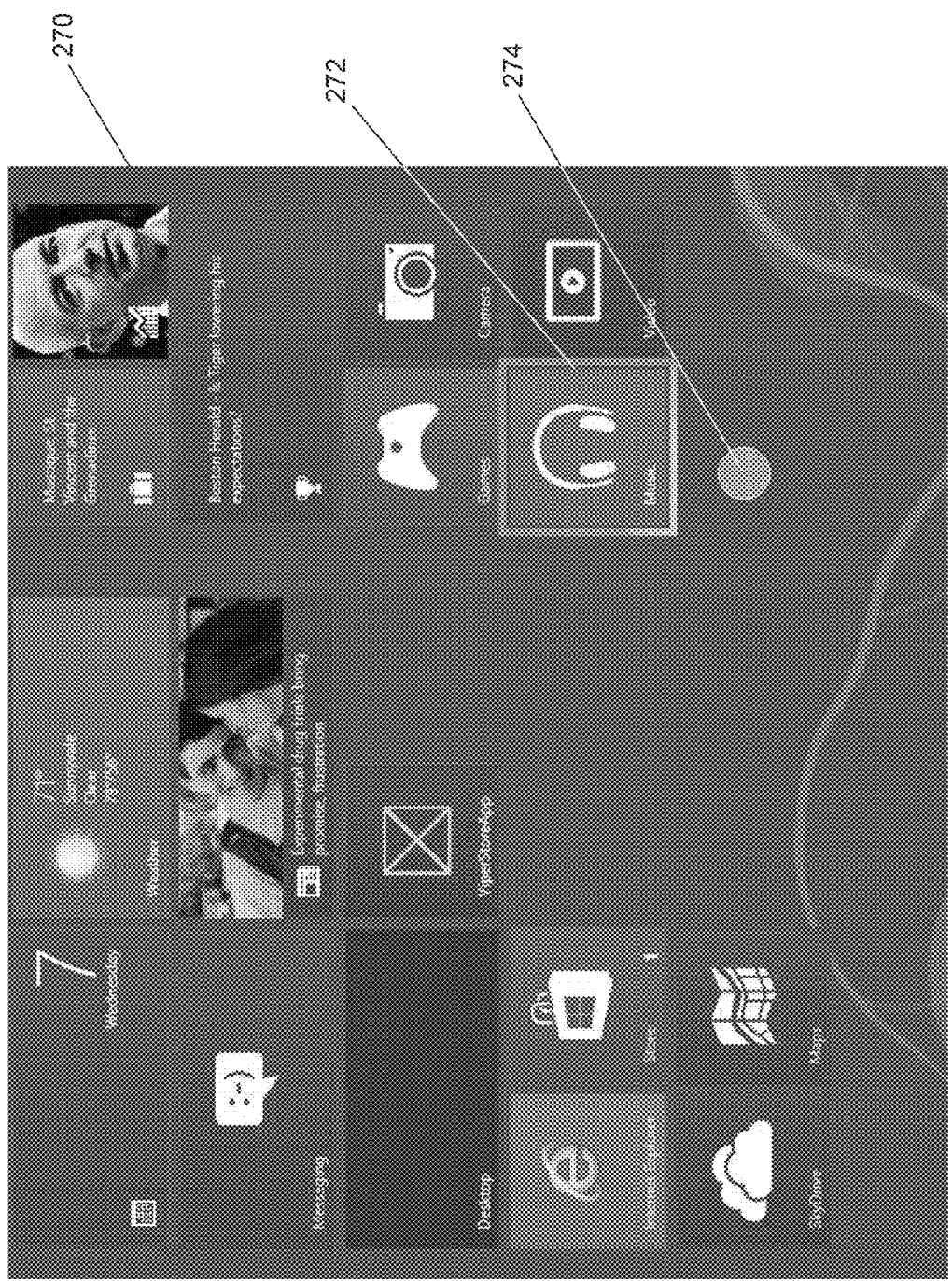
FIGS. 11A, 11B & 11C conceptually illustrate selection of a gesture reactive interface object within a user interface by targeting the interface object with a first targeting 3D gesture and selecting the interface object using a second selection 3D gesture in accordance with an embodiment of the invention.
Figure 11B:
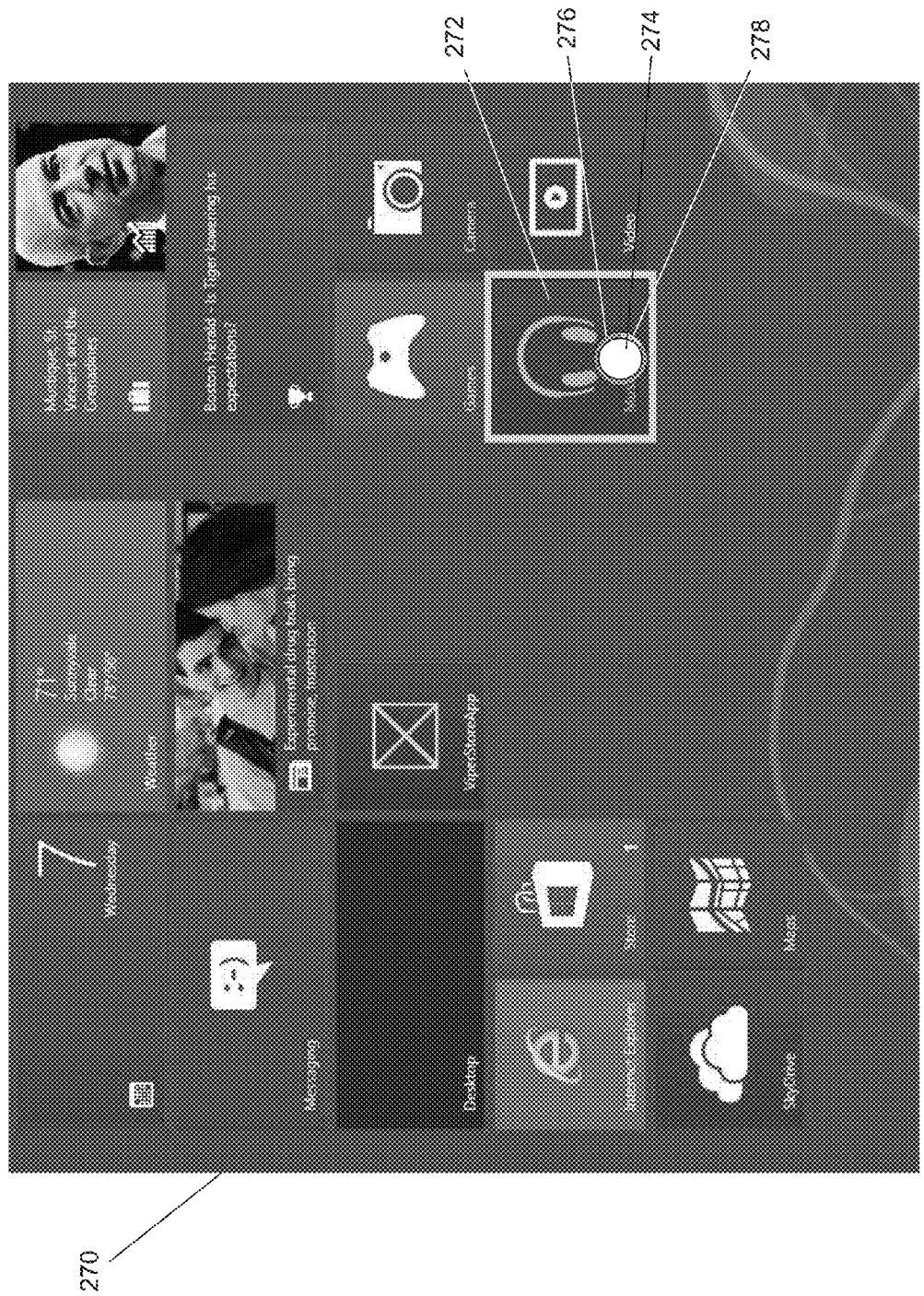
Figure 11C:
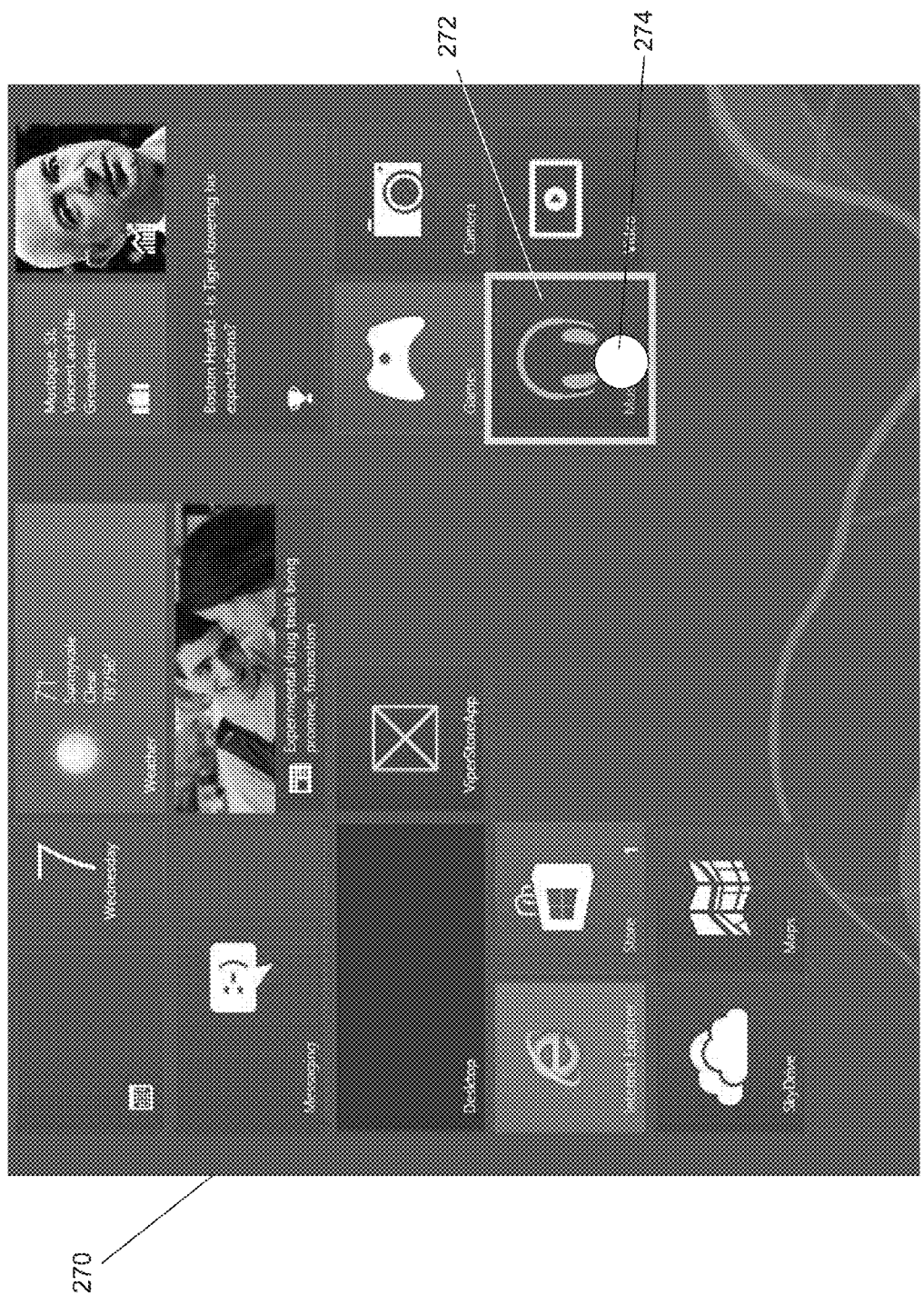

The selection of a gesture reactive interface object via 3D gesture input in accordance with an embodiment of the invention is illustrated in FIGS. 11A, 11B, and 11C. Referring first to FIG. 11A, a Windows 8 user interface 270 is displayed including a plurality of interface objects, one of which includes a tile graphical element 272 enabling launching of a media player application. In the illustrated embodiment, the user interface receives input via a 3D gesture based input modality. Specifically, the user input is shown receiving a pointing 3D gesture, the receipt of which is indicated by the display of a cursor 274 within the user interface. The user can target an interface object by moving the cursor into the target zone of the interface object using a pointing 3D gesture and holding the cursor within the target zone for a predetermined period of time (allowing for some hysteresis). Once the interface object is targeted, the user can interact with the targeted interface object using a second 3D gesture that can potentially be different to the targeting gesture and that need not occur within the initial target zone of the interface object.

The targeting of the tile 272 associated with an interface object that can launch a media player is shown in FIG. 11B. In order to provide visual feedback that the user has successfully targeted the relevant interface object, the cursor 274 changes from a transparent disc to a solid disk. In other embodiments, any of a variety of techniques can be utilized to provide visual feedback that an interface object is targeted including allowing the user to select between different cursor graphical elements corresponding to the states of no interface object targeted and interface object targeted. In many embodiments, the ability of the user to interact with the interface object within a predetermined period of time is also indicated using the cursor. In the illustrated embodiment, the cursor includes a band 276 that indicates the time remaining 278 in which a 3D gesture input can be provided in order to interact with the targeted interface object. When the predetermined time period expires, the band completely changes color and the cursor can revert back to the graphical element used to indicate that no interface object is targeted. If a cancelation 3D gesture is received, then the targeting of the interface object is terminated. If an interaction 3D gesture is received, then the user interface can provide visual feedback that the user successfully provided the command to interact with the interface object and updates the user interface based upon the interaction.

The selection of the tile 272 using a selection 3D gesture, which corresponds to a direction to launch a media player application, is illustrated in FIG. 11C. The cursor 274 is a solid white color to indicate that the user has selected the targeted interface object. While the cursor 274 is shown overlaid on the tile 272 corresponding to the selected interface object, the user can allow the cursor to move outside the initial target zone of the interface object to perform the selection gesture. In this way, the fatigue associated with continuous pointing can be reduced and/or selection 3D gestures that do not have a pointing or directional component can be utilized to provide 3D gesture input. Although specific visual feedback mechanisms and user interfaces are illustrated in FIGS. 11A-11C, any of a variety of visual feedback mechanism, cursor graphical elements, and user interfaces can be utilized to enable the targeting of an interface object using a first 3D gesture and interaction with the targeted interface object using a second 3D gesture in accordance with embodiments of the invention.

Interacting with Affordances

User interfaces in accordance with several embodiments of the invention can include gesture reactive interaction elements that are affordances showing target zones where a user may interact with the user interface via 3D gesture. The use of gesture reactive interaction elements to facilitate scrolling via 3D gesture in accordance with an embodiment of the invention is conceptually illustrated in FIGS. 12A and 12B. In the illustrated embodiment, the extent of the user interface 270 is much greater than the portion of the rendered user interface displayed 272 to the user. In order to inform the user of the ability to scroll the portion of the user interface that is displayed and to enable the user to perform the scrolling action, the user interface includes two gesture reactive interface elements (274, 276) that are rendered as affordances with respect to scrolling actions. Referring to FIG. 12B, the targeting of the affordance 274 by a pointing 3D gesture results in leftward scrolling of the displayed user interface from a first position 272 to a second position 278.

The process illustrated in FIGS. 12A and 12B is relatively simple and can be expanded upon to facilitate the ability of a user to initiate actions via the user interface. In many embodiments, the size of a gesture reactive interaction element can increase once a user starts interacting with the interactive element. In this way, the user can relax the accuracy with which the user is pointing at the display. In several embodiments, a user's interaction with a gesture reactive interaction element increases the size of the target zone of the interaction element (i.e. the target zone increases in size even though the graphical representation of the interaction element on screen remains the same size) to achieve a similar effect without modification of the display.

Figure 13:
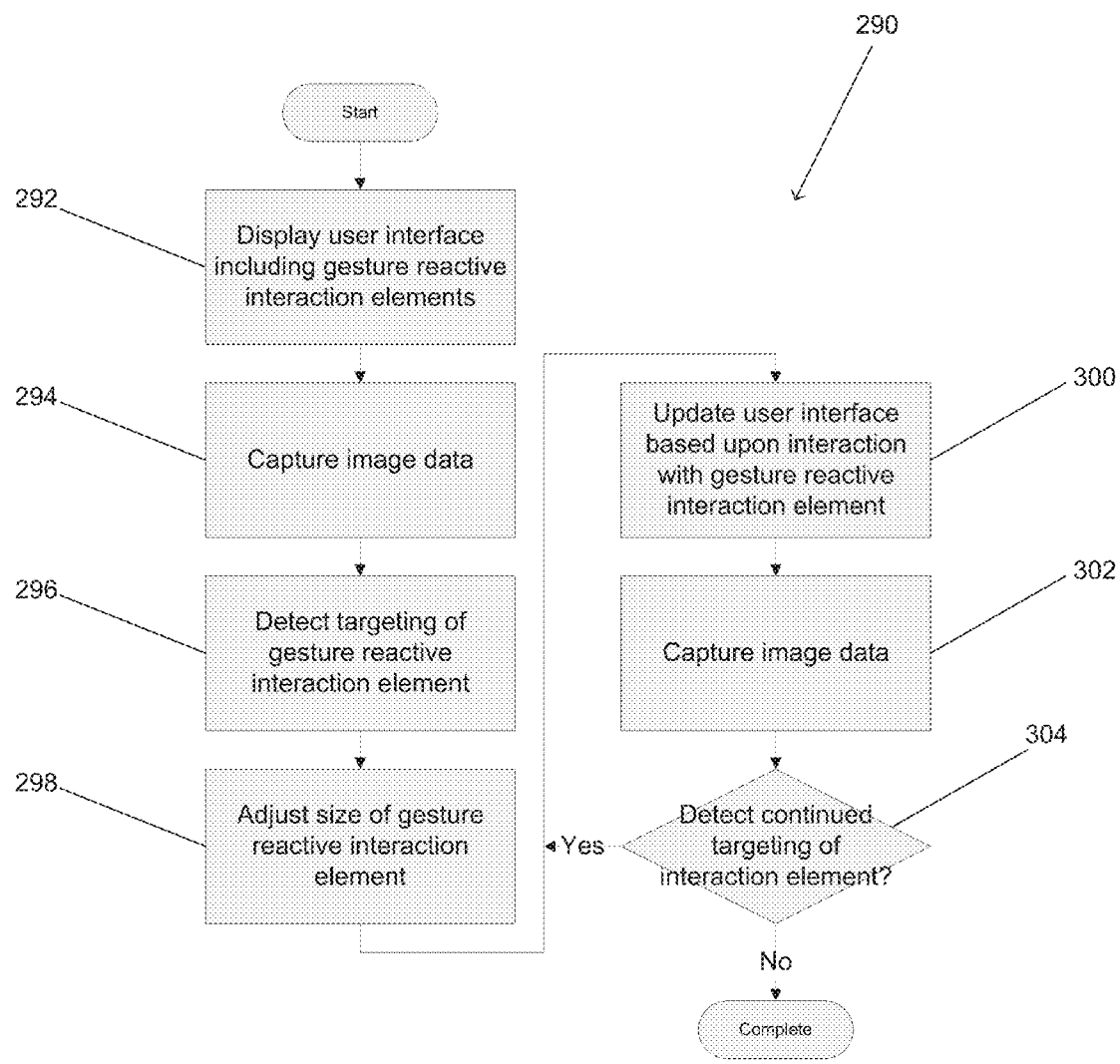
FIG. 13 is a flow chart illustrating a process for displaying interface elements that indicate target zones for performing scrolling interactions via 3D gesture, where the interface elements increase in size in response to targeting by a 3D gesture, in accordance with an embodiment of the invention.

A process for targeting an affordance within a user interface using a first 3D gesture in accordance with an embodiment of the invention is illustrated in FIG. 13. The process 290 includes displaying (292) a user interface including gesture reactive interaction elements and capturing image data (294) to detect (296) a 3D gesture targeting a gesture reactive interaction element. When a 3D gesture targeting a gesture reactive interaction element is detected, the size of the gesture reactive interface is increased (298) and the user interface is updated (300) based upon the action initiated by the user's targeting of the affordance. The process 290 continues to capture (302) image data and the user interface continues to update in response to the continued targeting (264) of the interaction element. In several embodiments, the processes of detecting continued targeting includes hysteresis to prevent the termination of an action in response to a hand tremor that briefly causes the user to cease targeting the target zone of the interaction element.

Although the above discussion of FIG. 13 references increasing the size of rendered graphical elements corresponding to interaction elements within a user interface in response to targeting by a 3D gesture, a similar effect can be obtained by increasing the target zone of the interaction element. Furthermore, embodiments of the invention are not limited to the specific process for modifying a user interface in response to the targeting of an interaction element via a 3D gesture illustrated in FIG. 13. Indeed, any of a variety of processes appropriate to the requirements of specific applications can be utilized to modify a user interface in response to the targeting of an interaction element via a 3D gesture in accordance with embodiments of the invention.

Figure 14A:
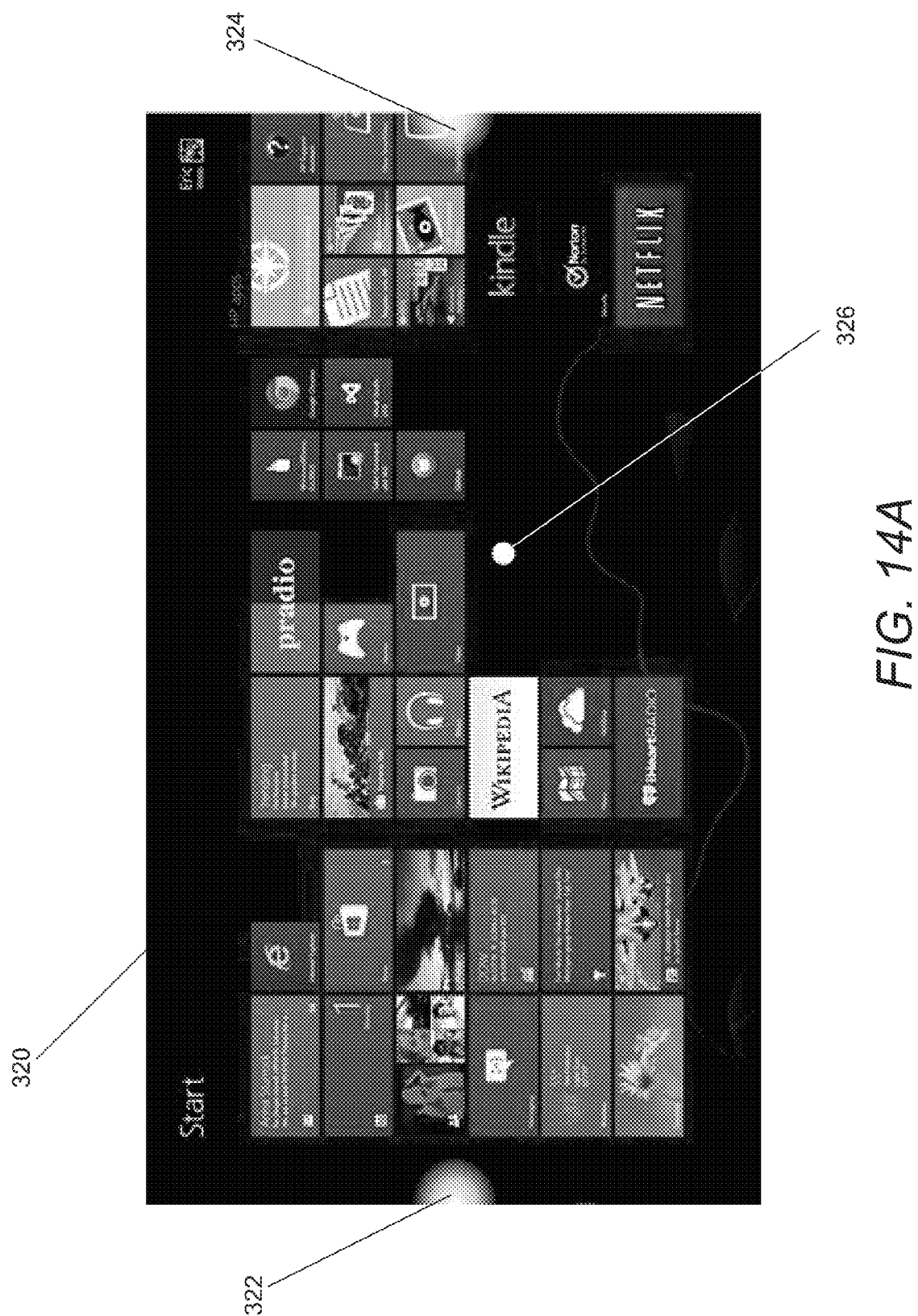
FIGS. 14A and 14B conceptually illustrate the modification of a user interface to increase the size of interface elements when the interface elements are targeted via a 3D gesture in accordance with an embodiment of the invention.
Figure 14B:
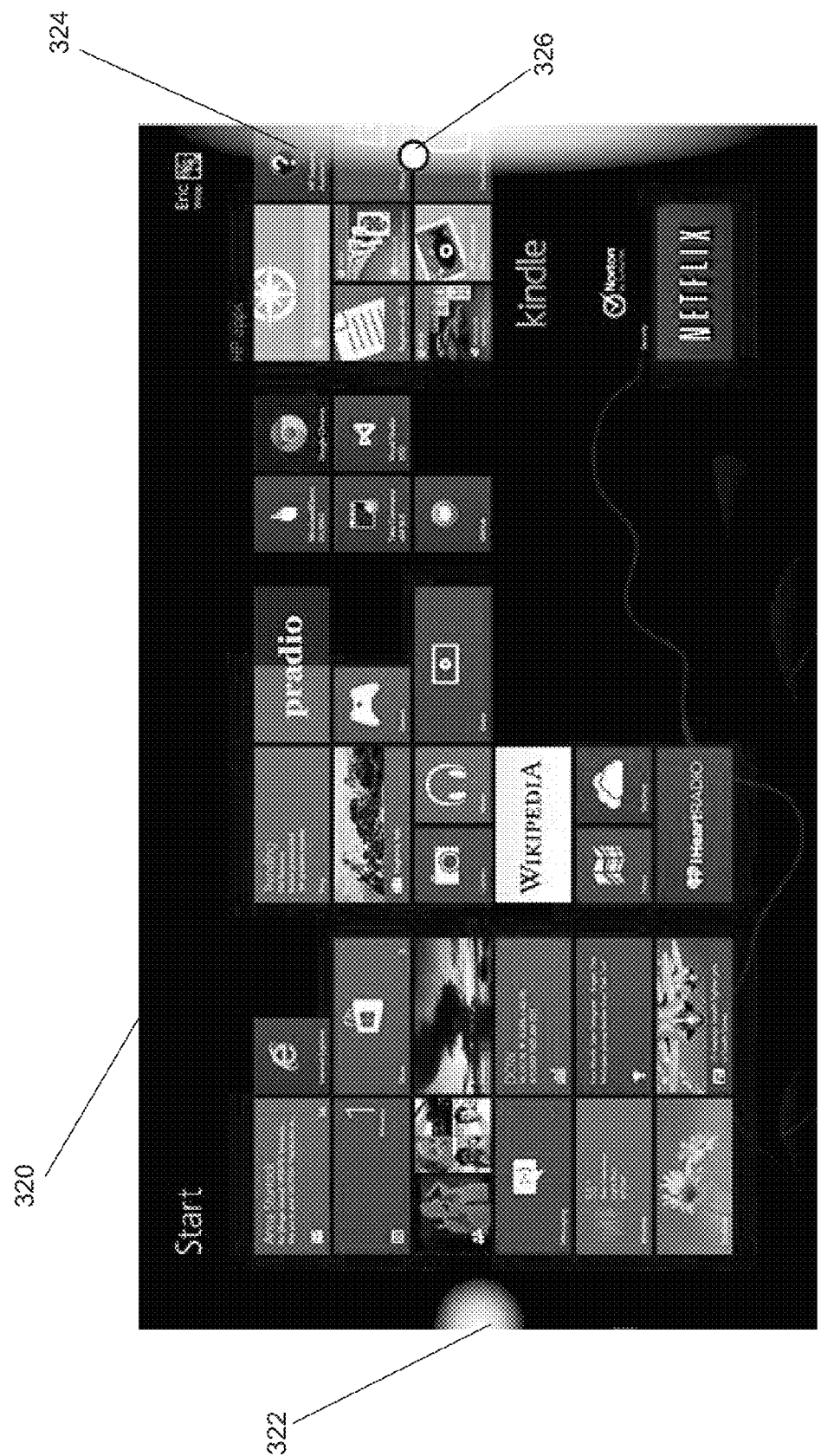

The modification of a user interface to increase the size of rendered graphical elements of an interaction element in response to the targeting of the interaction element via a 3D gesture is illustrated in FIGS. 14A and 14B. In the illustrated embodiment, the user interface includes affordances and targeting of the target zone of an interaction element causes an increase in the size of the affordance. Referring to FIG. 14A, a Windows 8 start display 320 including scrolling affordances is illustrated. The display includes a first scrolling affordance 322 enabling the user to scroll the user interface from the left to the right and a second scrolling affordance 324 enabling the user to scroll the user interface from the right to the left. In other embodiments, the direction of scrolling can be reversed. In addition to the affordance interaction elements, the user interface includes a cursor 326 indicating the location on the display currently targeted by pointing 3D gesture input provided by a user. Referring to FIG. 14B, a 3D gesture that targets the first affordance 322 (as indicated by the cursor 326 location) causes the user interface to increase the size of the affordance to facilitate the continued targeting of the affordance.

Figure 15A:
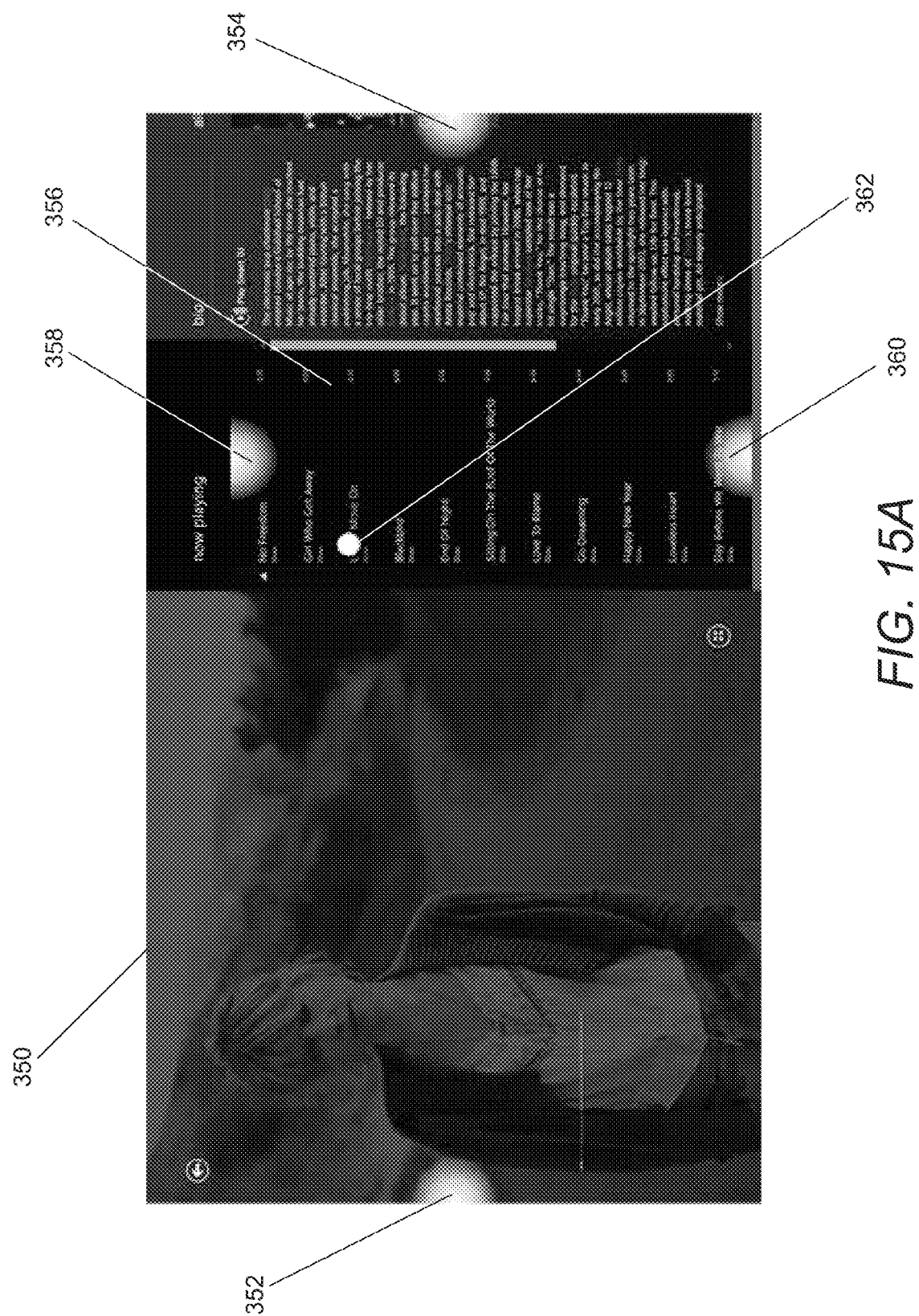
FIGS. 15A and 15B conceptually illustrate the modification of a user interface including nested interface objects to increase the size of an interface element within a nested interface object when the interface element is targeted via a 3D gesture in accordance with an embodiment of the invention.
Figure 15B:
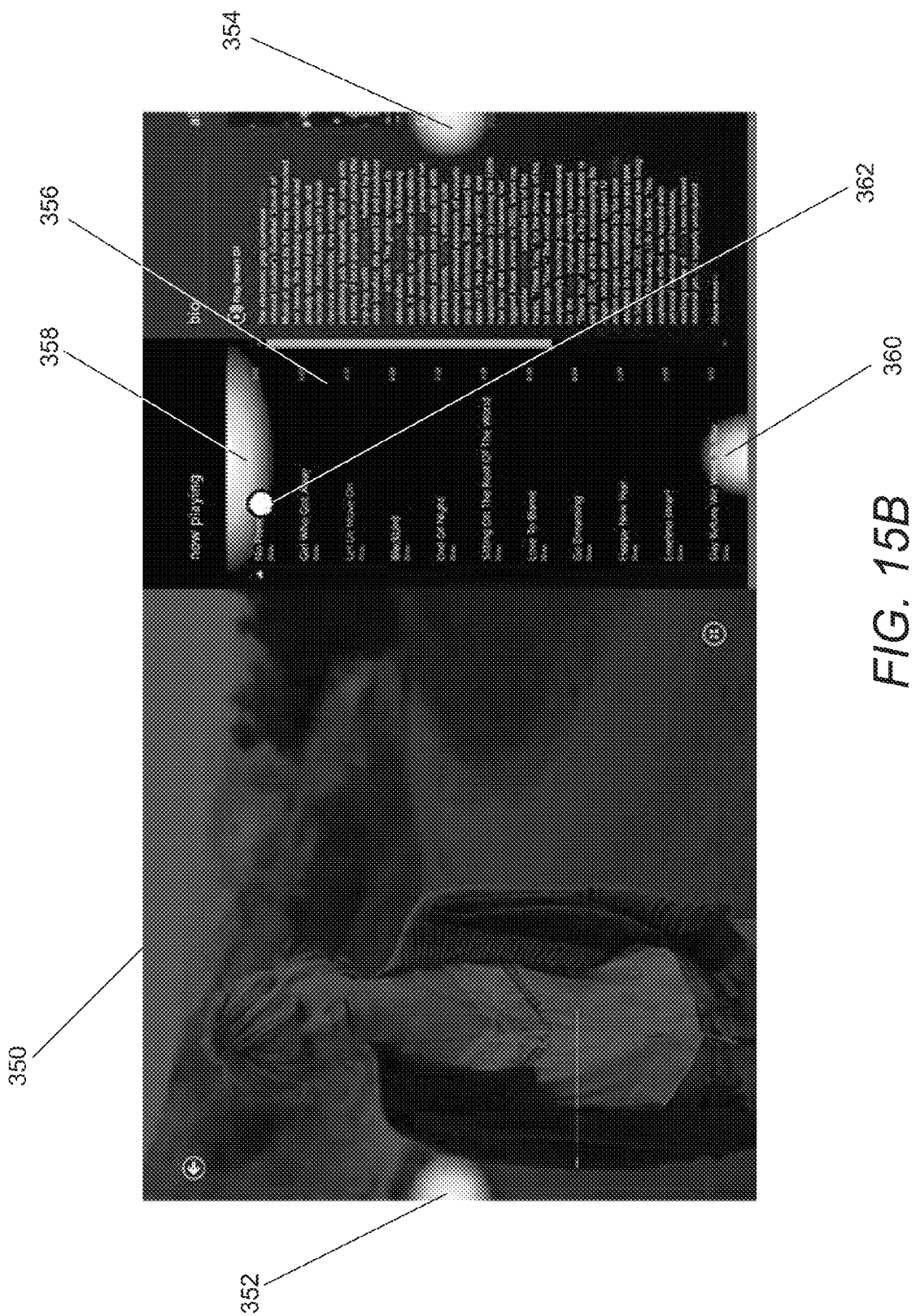

The modification of a user interface to increase the size of rendered graphical elements of an interaction element within nested interface objects in response to the targeting of the interaction element via a 3D gesture is illustrated in FIGS. 15A and 15B. In the illustrated embodiment, the user interface includes affordances including actions that can be taken with respect to a set of nested interface objects. Targeting the target zone of any of the interaction elements causes an increase in the size of the affordance. Referring to FIG. 15A, a media player user interface display 350 including nested interface objects is illustrated. The display includes a first scrolling affordance 352 enabling the user to scroll the user interface from the left to the right and a second scrolling affordance 354 enabling the user to scroll the user interface from the right to the left. In other embodiments, the direction of scrolling can be reversed. Nested within the display is a scrollable interface object 356 containing a track list for the media player and the user interface includes a third scrolling affordance 358 enabling the user to scroll down the track list down and a fourth affordance 360 enabling the user to scroll the track list up. In addition to the affordance interaction elements, the user interface includes a cursor 362 indicating the location on the display currently targeted by pointing 3D gesture input provided by a user. Referring to FIG. 15B, a 3D gesture that targets the third affordance 358 (as indicated by the cursor 362 location) causes the user interface to increase the size of the affordance to facilitate the continued targeting of the affordance.

In the embodiments described above, targeting an affordance for a predetermined period of time initiates an action. In many embodiments, targeting of an interaction element that is an affordance enables the selection of the interaction element in a manner similar to that described above with respect to gesture reactive interface objects in general. As such, a user can target an affordance with a first 3D gesture and can initiate an action like scrolling and/or zooming using a second interaction 3D gesture that need not involve continued pointing at the affordance. Examples of gestures that can be used to select a targeted affordance include (but are not limited to) performing a tapping gesture (moving a finger down and up in a manner evocative of tapping a virtual screen or virtual plane), a wiggle gesture (moving the finger back and forth or up and down), or performing a swiping gesture with one or more fingers.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of rendering a user interface on a computing device, comprising:
    rendering an initial user interface comprising a set of interface objects using a computing device, where each interface object in the set of interface objects includes a graphical element that is rendered when the interface object is rendered for display and a target zone within the user interface;
    detecting a targeting 3D gesture in captured image data that identifies a targeted interface object within the user interface using the computing device by:
        identifying a 3D interaction zone within the captured image data that maps to the user interface;
        determining the location of at least a portion of a human hand within the 3D interaction zone;
        identifying a first pose of the at least a portion of a human hand corresponding to a targeting 3D gesture;
        mapping the location of the at least a portion of a human hand within the 3D interaction zone to a location within the user interface;
        determining that the mapped location within the user interface falls within the target zone of a specific interface object within the user interface; and
        identifying the specific interface object as the targeted interface object in response to an identification of the first pose as a targeting gesture and a determination that the mapped location of at least a portion of the human hand falls with the target zone of the specific interface object;
    enabling a set of one or more interaction gestures for the targeted interface object in response to the detection of the targeting 3D gesture using the computing device wherein each of the one or more interaction gestures is associated with a permitted interaction in a set of permitted interactions allowed for the targeted interface object and each permitted interaction is an action performed via the user interface to manipulate the targeted interface object;

changing the rendering of at least the targeted interface object within the user interface in response to the targeting 3D gesture that targets the interface object using the computing device;

detecting an interaction 3D gesture from the set of one or more interaction gestures for the targeted interface object in additional captured image data that identifies a specific interaction from the set of permitted interactions with the targeted interface object using the computing device, where the detection of the interaction 3D gesture comprises:

tracking the motion of at least a portion of a human hand within the 3D interaction zone in the additional captured image data;

identifying a change in pose of at least a portion of a human hand within the 3D interaction zone from the first pose to a second pose during the motion of the at least a portion of the human hand irrespective of the location of the at least a portion of a human hand within the 3D interaction zone during the motion; and identifying the second pose of the at least a portion of the human hand as corresponding to one of the 3D interaction gestures from the set of one or more interactive gestures to control the targeted interface object, the identifying the second pose being independent of a mapping between the user interface and a location of the human hand in the 3D interaction zone;

modifying the user interface in response to the specific interaction with the targeted interface object identified by the detected interaction 3D gesture using the computing device; and rendering the modified user interface using the computing device.

2. The method of claim 1, wherein:

the computing device is part of a real-time gesture based interactive system further comprising a display device and an image capture system;

and the method further comprises:

displaying the rendered user interfaces using the display; and capturing the captured image data and the additional captured image data using the image capture system.

3. The method of claim 1, wherein the targeting 3D gesture is a pointing motion towards the target zone of the targeted interface.

4. The method of claim 1, wherein changing the rendering of at least the targeted interface object within the user interface in response to the 3D gesture targeting the interface object using the computing device further comprises changing the size of the graphical element of the targeted interface object.

5. The method of claim 1, wherein changing the rendering of at least the targeted interface object within the user interface in response to the 3D gesture targeting the interface object using the computing device further comprises changing the size of the graphical elements of a plurality of interface objects including the targeted interface object.

6. The method of claim 1, wherein changing the rendering of at least the targeted interface object within the user interface in response to the 3D gesture targeting the interface object using the computing device further comprises changing the size of the target zone of the targeted interface object and rendering a graphical element indicating the location of the target zone.

7. The method of claim 1, wherein changing the rendering of at least the targeted interface object within the user interface in response to the 3D gesture targeting the interface object using the computing device further comprises changing the size of the target zone of a plurality of interface objects including the targeted interface object and rendering graphical elements indicating the location of the target zone of each of the plurality of interface objects.

8. The method of claim 1, further comprising displaying an interaction element indicating the time remaining to interact with the targeted interface object in response to the targeting 3D gesture targeting the interface object for a predetermined period of time using the computing device.

9. The method of claim 8, wherein detecting an interaction 3D gesture from the set of one or more interaction gestures for the targeted interface object in the additional captured image data that identifies a specific interaction with a targeted interface object using the computing device further comprises detecting the interaction 3D gesture within a predetermined time period from the receipt of the detection of the targeting 3D gesture.

10. The method of claim 1, wherein determining that the tracked motion of at least a portion of a human hand within the 3D interaction zone corresponds to an interaction 3D gesture from the set of one or more interaction gestures for the targeted interface object further comprises identifying motion corresponding to at least one motion selected from the group consisting of:

bending and straightening of at least one finger; and
lowering and raising of at least one finger.

11. The method of claim 1, the method further comprising determining that the targeting 3D gesture targets the targeted interface object for a predetermined period of time, where the determination considers the targeting 3D gesture to be targeting the targeted interface object during any period of time in which the targeting 3D gesture does not target the interface object that is less than a hysteresis threshold.

12. The method of claim 1, further comprising:

detecting an input via a 3D gesture input modality from captured image data using the computing device; and changing the manner in which the initial user interface is rendered in response to detection of input via a 3D gesture input modality using the computing device.

13. The method of claim 12, wherein changing the manner in which the initial user interface is rendered in response to detection of input via a 3D gesture input modality further comprises changing at least one selected from the group consisting of:

the size of the graphical elements of a plurality of interface objects;

the size of the target zones of a plurality of interface objects and rendering graphical elements showing the locations of the target zones; and the size of the region of the user interface that is rendered.

14. The method of claim 12, wherein:

detecting an input via a 3D gesture input modality further comprises determining a distance from the display at which 3D gestures are being performed to provide 3D gesture input from the captured image data; and changing the manner in which the initial user interface is rendered in response to detection of input via a 3D gesture input modality further comprises changing the manner in which the user interface is rendered based upon the distance from the display at which 3D gestures are being performed to provide 3D gesture input.

15. The method of claim 1, further comprising:
   determining a distance of a user from a display on which the rendered user interface is being displayed using the computing device; and
   changing the manner in which the initial user interface is rendered by the computing device based upon the distance of the user from the display on which the rendered user interface is being displayed.

16. The method of claim 15, wherein changing the manner in which the initial user interface is rendered based upon the distance of the user from the display on which the rendered user interface is being displayed further comprises changing at least one selected from the group consisting of:
   the size of the graphical elements of a plurality of interface objects;
   the size of the target zones of a plurality of interface objects and rendering graphical elements showing the locations of the target zones; and
   the size of the region of the user interface that is rendered.

17. The method of claim 1, wherein the size of at least one of a rendered graphical element or a target zone of at least one interface object is determined based upon at least one of the size of a display on which the rendered user interface is displayed and the resolution of the display.

18. The method of claim 1, further comprising increasing the size of the target zone of the targeted interface object within the user interface in response to the detection of the targeting 3D gesture that targets the interface object using the computing device.

19. The method of claim 1, further comprising:
   detecting an input via a 3D gesture input modality from captured image data using the computing device; and
   increasing the size of the target zones of at least one interface object within the user interface in response to the detection of the input via the 3D gesture input modality using the computing device.

20. A method of rendering a user interface on a real-time gesture based interactive system comprising an image capture system including at least two cameras, an image processing system and a display device, the method comprising:
   rendering an initial user interface comprising a set of interface objects using the image processing system, where each interface object comprises:
   a graphical element that is rendered when the interface object is rendered for display;
   a target zone that defines at least one region in the user interface in which a targeting three-dimensional (3D) gesture targets the interface object; and
   a description of a set of permitted interactions;
   displaying the rendered user interface using the display;
   capturing image data using the image capture system;
   detecting an input via a 3D gesture input modality from the captured image data using the image processing system;
   changing the manner in which the initial user interface is rendered in response to detection of an input via a 3D gesture input modality using the image processing device;
   displaying the rendered user interface using the display;
   detecting a targeting 3D gesture that targets a targeted interface object within the user interface using the image processing system by:
   identifying a 3D interaction zone within the captured image data that maps to the user interface;
   determining the location of at least a portion of a human hand within the 3D interaction zone from the captured image data;
   identifying a first pose of the at least a portion of a human hand within the target zone that corresponds to a targeting 3D gesture;
   mapping the location of the at least a portion of a human hand within the 3D interaction zone to a location within the user interface;
   determining that the mapped location within the user interface falls within the target zone of a specific interface object in the user interface;
   identifying the specific interface object as the targeted interface object in response to an identification of the first pose as the targeting gesture and a determination that the mapped location of the at least a portion of the human hand falls within the target zone of the specific interface object in the user interface; and
   changing the rendering of at least the targeted interface object within the user interface in response to the 3D gesture targeting the interface object using the image processing system;
   displaying the user interface via the display;
   capturing additional image data using the image capture system;
   determining that the targeting 3D gesture targets the targeted interface object for a predetermined period of time, where the determination considers the targeting 3D gesture to be targeting the targeted interface object during any period of time in which the targeting 3D gesture does not target the targeted interface object that is less than a hysteresis threshold;
   enabling a set of one or more interaction gestures for the targeted interface object in response to the detection of the targeting 3D gesture using the computing device wherein each of the one or more interaction gestures is associated with a permitted interaction in a set of permitted interactions allowed for the targeted interface object and each permitted interaction is an action performed via the user interface to manipulate the targeted interface object;
   displaying an interaction element indicating the time remaining to interact with the targeted interface object in response to a determination that the targeting 3D gesture has targeted the interface object for a predetermined period of time using the image processing system;
   detecting an interaction 3D gesture for the set of one or more interaction gestures in additional captured image data within a predetermined time period from the detection of the targeting 3D gesture input, where the interaction 3D gesture identifies a specific interaction with the targeted interface object using the image processing system and is detected by:
   tracking the motion of at least a portion of a human hand within the 3D interaction zone;
   identifying a change in pose of at least a portion of a human hand within the 3D interaction zone from the first pose to a second pose during the motion of the at least a portion of the human hand has changed and corresponds to an interaction 3D gesture from the set of one or more interaction gestures for the targeted interface object irrespective of the location of the at least a portion of a human hand within the 3D interaction zone during the motion;
   identifying the second pose of the at least a portion of the human hand as corresponding to one of the 3D interaction gestures from the set of one or more interactive gestures to control the targeted interface object, the identifying the second pose being independent of a mapping between the user interface and a location of the human hand in the 3D interaction zone;

verifying that the interaction gesture is associated with a specific interaction within the set of permitted interactions for the interface object using the image processing system;

modifying the user interface in response to the specific interaction with the targeted interface object identified by the interaction 3D gesture using the image processing system;

rendering the modified user interface using the image processing system; and displaying the rendered user interface using the display.

21. A real-time gesture based interactive system configured to display a user interface and receive three-dimensional (3D) gesture based input, comprising:

a processor;

an image capture system configured to capture image data and provide the captured image data to the processor;

memory containing:
an operating system;
an interactive application; and
a 3D gesture tracking application;

wherein the interactive application and the operating system configure the processor to:

generate and render an initial user interface comprising a set of interface objects, where each interface object includes a graphical element that is rendered when the interface object is rendered for display and a target zone that defines at least one region in the user interface in which the interface object is to be targeted; and modify an initial user interface in response to a detected interaction with a targeted interface object and render an updated user interface; and wherein the 3D gesture tracking application and the operating system configure the processor to:

capture image data using the image capture system;

detect a targeting 3D gesture in captured image data that identifies a targeted interface object within a user interface by:

identifying a 3D interaction zone within the captured image data that maps to the user interface;

determining the location of at least a portion of a human hand within the 3D interaction zone;

identifying a first pose of the at least a portion of a human hand that corresponds to a targeting 3D gesture;

mapping the location of the at least a portion of a human hand within the 3D interaction zone to a location within the user interface;

determining that the mapped location within the user interface falls within a target zone of a specific interface object; and identifying the specific interface object as the targeted interface object in response to an identification of the first pose as a targeting gesture and a determination that the mapped location of at least a portion of the human hand falls with the target zone of the specific interface object;

enable a set of one or more interaction gestures for the targeted interface object in response to the detection of the targeting 3D gesture using the computing device wherein each of the one or more interaction gestures is associated with a permitted interaction in a set of permitted interactions allowed for the targeted interface object and each permitted interaction is an action performed via the user interface to manipulate the targeted interface object;

change the rendering of at least the targeted interface object within a user interface in response to detection of a targeting 3D gesture that targets the interface object;

detect an interaction 3D gesture from the set of one or more interaction gestures for the targeted interface object in captured image data that identifies a specific interaction with a targeted interface object, where the detection of the interaction 3D gesture comprises:

tracking the motion of at least a portion of a human hand within the 3D interaction zone in the additional captured image data;

identifying a change in pose of at least a portion of a human hand within the 3D interaction zone from the first pose to a second pose during the motion of the at least a portion of the human hand irrespective of the location of the at least a portion of a human hand within the 3D interaction zone during the motion; and identifying the second pose of the at least a portion of the human hand as corresponding to one of the 3D interaction gestures from the set of one or more interactive gestures to control the targeted interface object, the identifying the second pose being independent of a mapping between the user interface and a location of the human hand in the 3D interaction zone; and provide events corresponding to specific interactions with targeted interface objects to the interactive application.

* * * * *